United States Patent [19]

Holland, Jr.

[11] Patent Number: 4,582,013
[45] Date of Patent: Apr. 15, 1986

[54] SELF-ADJUSTING WIND POWER MACHINE

[75] Inventor: Raymond P. Holland, Jr., Roswell, N. Mex.

[73] Assignee: The Holland Corporation, Roswell, N. Mex.

[21] Appl. No.: 509,370

[22] Filed: Jun. 30, 1983

Related U.S. Application Data

[63] Continuation-in-part of Ser. No. 220,177, Dec. 23, 1980, abandoned.

[51] Int. Cl.$^4$ .............................................. B63H 9/02
[52] U.S. Cl. ...................................... 114/102; 290/44; 290/55; 416/4; 416/19; 416/139
[58] Field of Search ................. 290/44, 55; 416/4, 19, 416/139 R, 139 A; 440/8; 114/39, 102, 103; 244/10, 21, 206

[56] References Cited

U.S. PATENT DOCUMENTS

| | | | |
|---|---|---|---|
| Re. 18,122 | 7/1931 | Flettner | 244/10 |
| 2,363,827 | 11/1944 | Albers | 290/44 |
| 3,580,203 | 5/1971 | Martin | 114/39 |
| 4,048,947 | 9/1977 | Sicard | 290/55 X |
| 4,307,677 | 12/1981 | Jastram et al. | 244/206 X |

FOREIGN PATENT DOCUMENTS

| | | | |
|---|---|---|---|
| 558426 | 7/1929 | Fed. Rep. of Germany | 114/102 |
| 2430630 | 4/1976 | Fed. Rep. of Germany | 114/102 |
| 462037 | 3/1937 | United Kingdom | 416/19 |

*Primary Examiner*—Sherman D. Basinger

[57] ABSTRACT

A machine for economical recovery of wind power employs a self-adjusting mass-balanced aerodynamic blade weathervaning freely around a lengthwise pitching axis forward of its aerodynamic center, and an aerodynamic roller in its leading edge, spun at high RPM by a motor. The roller controls aerodynamic performance to high levels of efficiency at high lift coefficients, employing novel roller/airfoil profiles. For ship propulsion, the self-adjusting blade with roller stopped is like a furled sail, and with the blade held angling to the wind with roller spinning is like a large, efficient, easily controlled sail. On a horizontal axis wind turbine, the self-adjusting blade is continuously held to an efficient angle of attack by centrifugal lift-increasing pitching moments balancing aerodynamic lift-decreasing pitching moments. The blade whirls steadily despite fluctuations of wind speed and direction, reducing stresses, and preventing structural damage or loss of efficiency. Gyroscopic blade teetering moments are neutralized by mass-balance counter-spin, using a single blade with a balancing stub, on a teetering pivot at the mill shaft. A teetering pivot at the top of the mast and horizontal tail surfaces complete an overall dynamic stress relief system. Sensors monitor operating conditions, control roller speed and move centrifugal mass positions for optimum power output.

32 Claims, 28 Drawing Figures

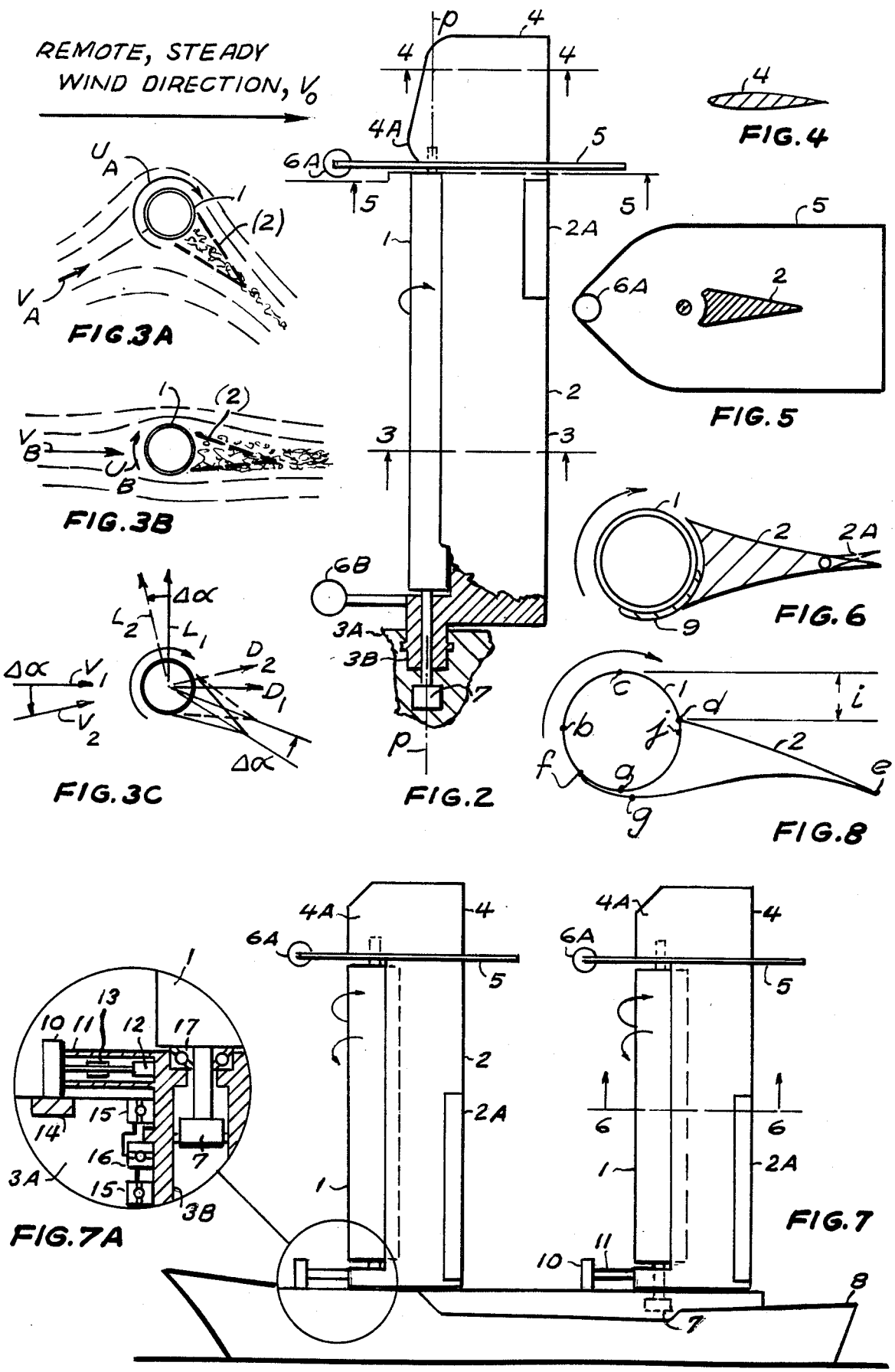

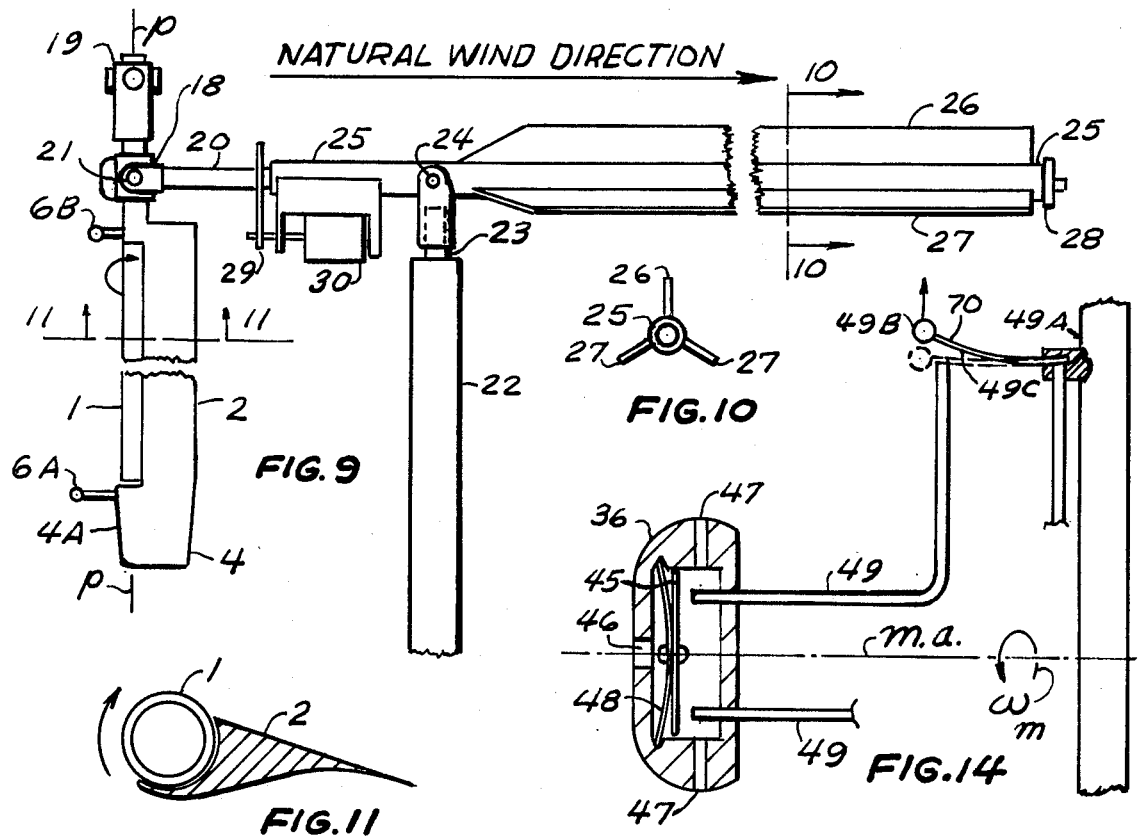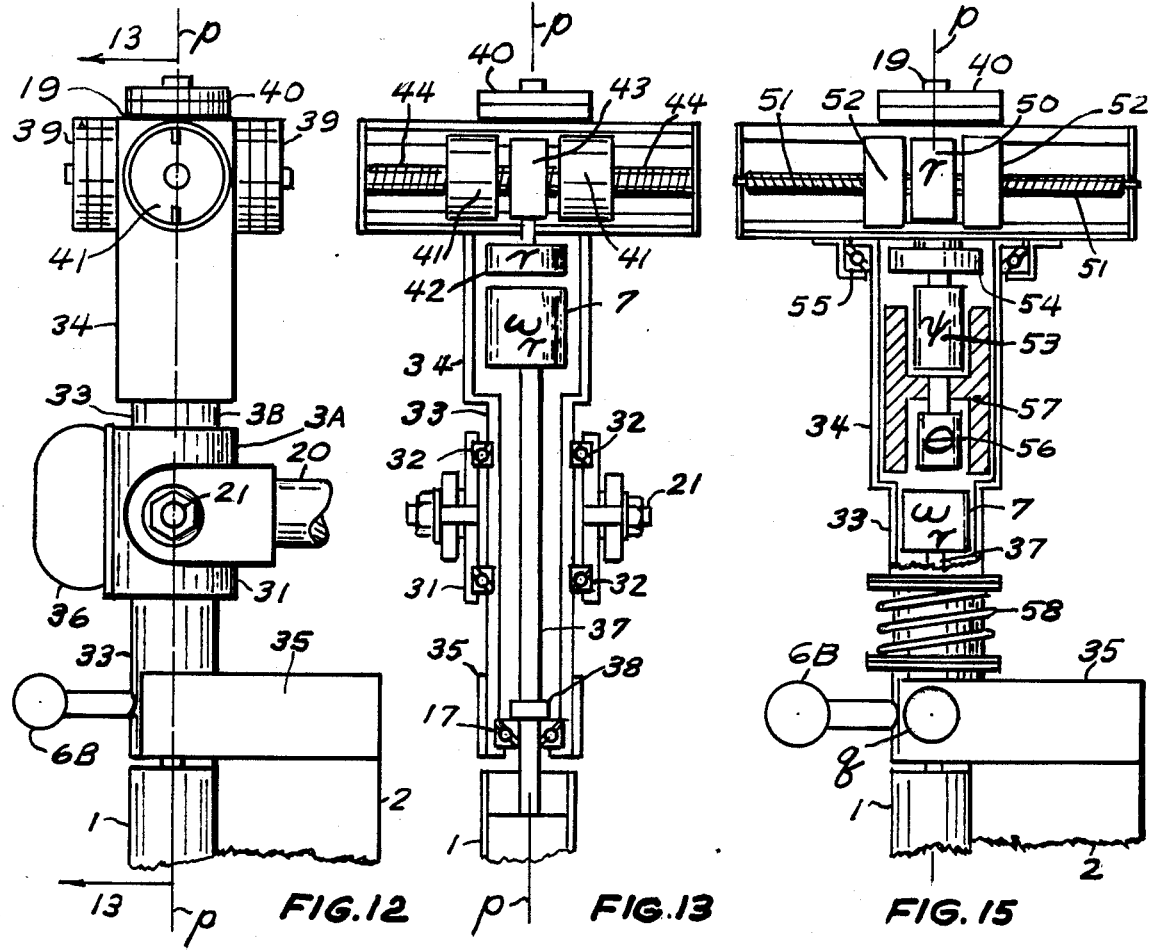

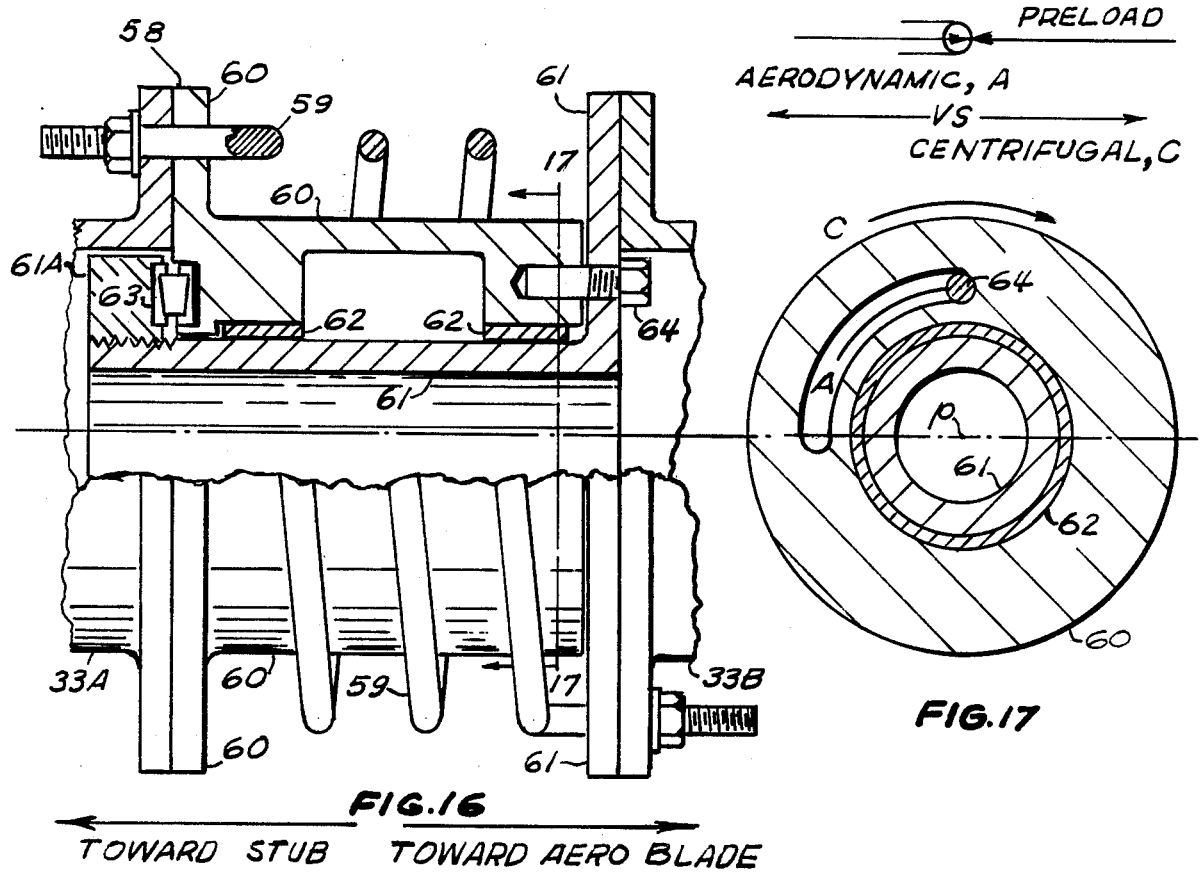
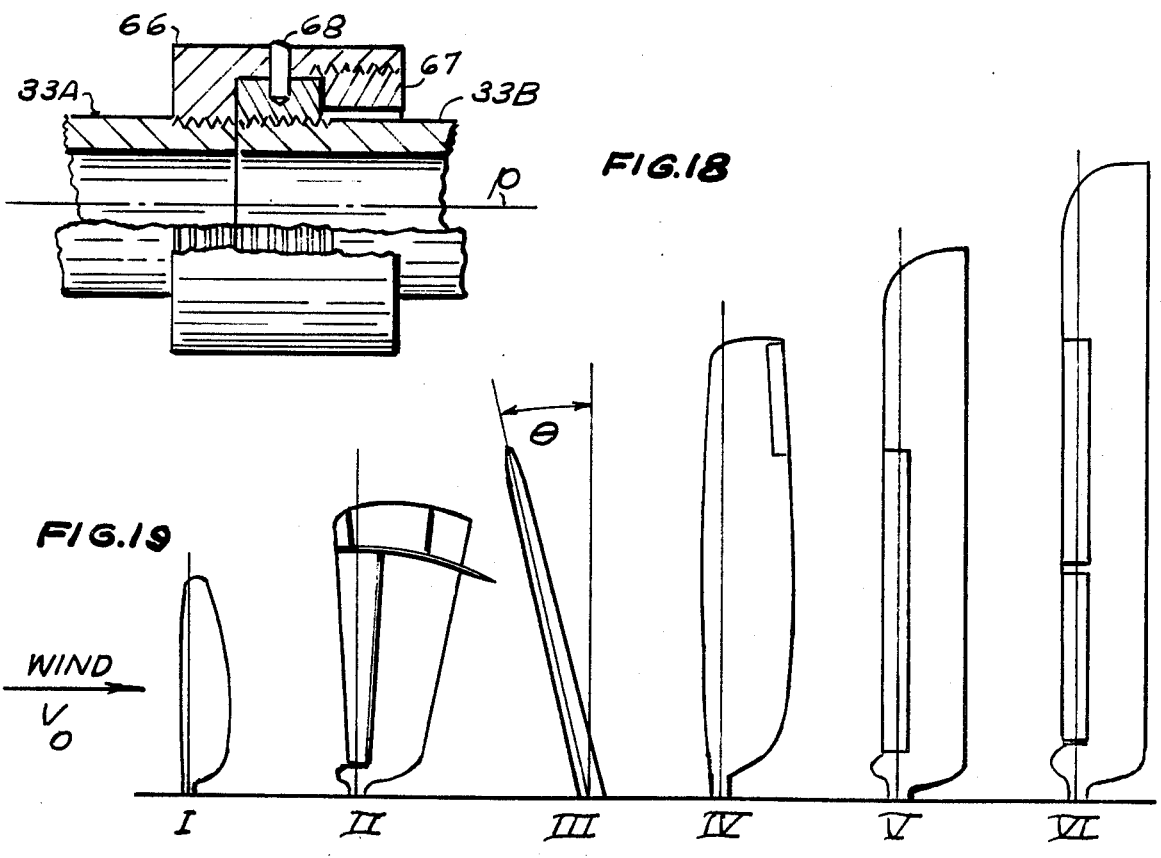

SELF-ADJUSTING WIND POWER MACHINE

CROSS REFERENCE TO RELATED APPLICATION

This application is a continuation-in-part of application Ser. No. 06/220,177 filed Dec. 23, 1980 and now abandoned.

The present invention relates to improvements in wind power machines.

OBJECTS OF THE INVENTION

The primary object of the present invention is to improve the economic viability of wind power machines by producing a new type which is:

Not damaged or rendered inefficient by severe gusts, strong winds, or wind stream dissymmetries.

Cost effective in a wide range of sizes, from small housetop wind turbines for individual residences to the largest turbines for public utility power networks.

Practical and versatile in a wide range of uses, a turbine, for example, being competitive with the familiar farm/ranch windmill for pumping water, and an application to a sailing ship being commercially competitive on the world's shipping lanes.

Self-adjusting to varying conditions of wind speed, direction, and turbulence by means of simple inexpensive reliable mechanisms, while maintaining high aerodynamic efficiency.

Self-adjusting to precise RPM for production of high quality alternating current, largely independent of variations of wind speed, by means of the same type of simple reliable mechanisms.

Relatively free of vibration troubles.

Relatively free of aerodynamic noise.

Able to operate productively both at lower wind speeds and higher wind speeds than existing equipment.

Insensitive, operating steadily despite wind stream irregularities.

Suitable for use in locations of high wind turbulence, where present equipment cannot operate without unacceptable loss of efficiency and threat of structural damage.

Capable of a long productive life, relatively free of maintenance costs.

BRIEF DESCRIPTION OF THE DRAWING

FIG. 2 shows the basic roller blade of this invention.

FIGS. 3A and 3B illustrate the air flow around the spinning roller and the effect of the ratio, peripheral speed to wind speed, U/V, on the airflow pattern. FIG. 3C illustrates the insensitivity of the weathervaning roller/airfoil section to gusts.

FIG. 4 shows the airfoil section at the tip of the blade beyond the roller, taken at section 4—4 of FIG. 2.

FIG. 5 shows an aerodynamic plate to reduce induced drag, attached rigidly to the blade, normal to the roller axis, beyond the roller, taken at view 5—5 of FIG. 2.

FIG. 6 shows the cross section of a ship-propelling roller blade, taken at section 6—6 of FIG. 7.

FIG. 7 shows two weathervaning roller blades applied to power a ship, including details in cross section at the attachment to the ship, in FIG. 7A.

FIG. 8 shows the generalized aerodynamic cross sectional profile form of the roller blade to power a horizontal axis wind turbine.

FIG. 9 through FIG. 11 show the blade applied to a gust-shedding one-bladed wind turbine, with FIGS. 10 and 11 taken at views 10—10 and 11—11 respectively of FIG. 9.

FIG. 12 through FIG. 14 show details of the hub and balancing stub of the wind turbine of FIGS. 9 through 11, with FIG. 13 taken at section 13—13 of FIG. 12. FIG. 14 is a cross section of wind sensing switch 36 on FIG. 12.

FIG. 15 shows additional and alternate hub and stub details of a one-bladed wind turbine.

FIGS. 16 and 17 show the type of preloaded spring used in FIG. 15.

FIG. 18 shows a safety shear pin construction for protecting the blade in extreme high winds.

FIG. 19 illustrates several variations of the freely weathervaning wind turbine blade for various purposes.

DESCRIPTION OF PRIOR ART

Figure 1A:
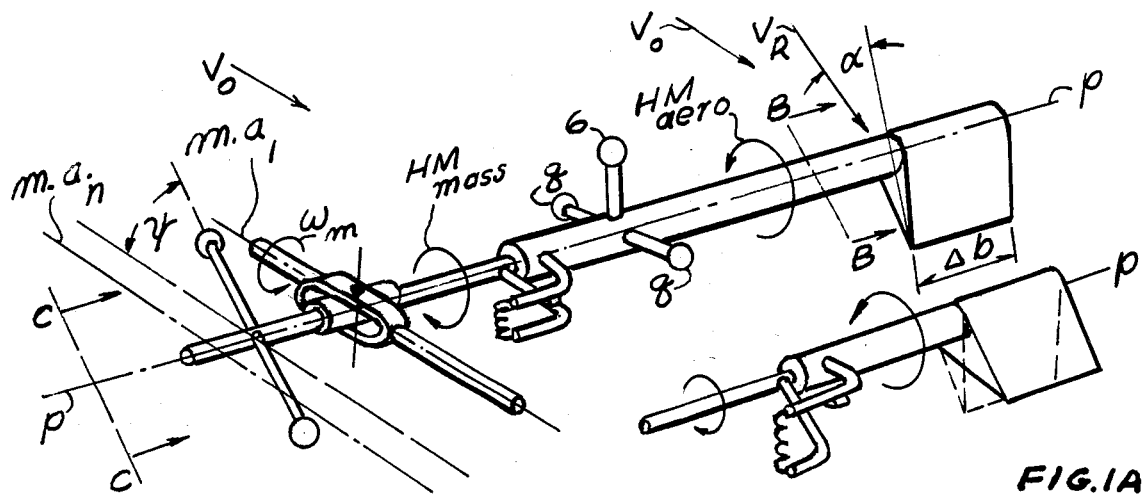
FIGS. 1A through 1E are diagrams illustrating the interaction of aerodynamic and centrifugal moments which govern the aerodynamic angle of attack of the freely weathervaning blade of this invention, on a horizontal axis wind turbine, maintaining essentially constant blade lift during wind gusts, and controllable by changing the positions of centrifugal masses. A preloaded spring governs the centrifugal action, assuring against excessive whirling speed.

Wind power machines are expensive to construct and maintain, relative to the value of the power which they deliver, because wind energy is thinly dispersed, requiring extended structures influencing large volumes of air. In the present art, such machines are typically fragile, subject to vibration, loss of aerodynamic efficiency, and failure in strong or gusty winds. They operate in a limited range of wind speed, failing to collect energy from winds outside that range. They employ expensive mechanisms to control their speed and shut them down to protect them from destructive forces, thereby failing to collect energy when it is potentially abundant. Consequently, at the present time the dollar cost of delivering each unit of wind energy tends to be high, even though the wind energy itself costs nothing.

The Magnus Roller

The airfoil in the form of sail, vane, blade, or wing, is the elemental aerodynamic force-producing device now used in all efficient wind power machines. Another aerodynamic force-producing device, the rotating cylinder, or Magnus rotor, can produce ten times as much lift force as the airfoil, for equal projected areas and wind speeds. The rotor is spun mechanically, requiring a small amount of power.

To avoid confusion of language with the helicopter *rotor*, which is a form of airfoil and is not a rotating cylinder, I shall use the term "Magnus *roller*" instead of "Magnus *rotor*".

The Magnus roller has not come into general use, largely because of aerodynamic inefficiencies due to the manner in which it has been employed. As taught in prior art, it is a circular sectioned cylinder with a large flat circuit disk *rigidly* attached to the cylinder at the end, such that the disk spins when the roller spins.

Anton Flettner applied this device to the Flettner Rotor Ship, a form of sailing ship, and to the Flettner Rotor Windmill, in the 1920's. See F. O. Willhofft, Industrial Applications of the Flettner Rotor, Transactions of the American Society of Mechanical Engineers, March 1927.

In the period of 1929-1934, Julius Madaras applied the same from a Magnus roller, standing vertically, to propel a car rolling on rails to obtain electrical power from the wind. See U.S. Pat. No. 1,791,731 and Popular Science Monthly, January 1932 and January 1934.

For recent work following Madaras see Whitford, Dale, H., et al, An Analysis of the Madaras Rotor Power Plant, University of Dayton Research Institute, Dayton, Ohio, June 1978, U.S. Department of Energy HQS-2554-78/2 UC-60.

Magnus roller tests were begun at Gottingen University in Germany about 1906 by Ludwig Prandtl. See Prandtl and Tietjens, Applied Hydro- and Aeromechanics, Dover Publications, New York. Further tests were conducted as late as 1932 by Busemann at Gottingen. See W. F. Durand, Aerodynamic Theory, Vol. IV, page 16. All of the research and experimentation has been conducted with the classic form of Magnus roller *having the spinning circular end disk rigidly attached.*

The aerodynamic performance of the Magnus roller is dominated by the ratio U/V, where U is the outer surface velocity of the roller section, due to spinning on its axis, and V is the velocity of the approaching wind, perpendicular to the roller axis.

The classic form of the Magnus roller *with its spinning end disks* has basic aerodynamic shortcomings at all values of U/V, as described in items (1) through (3) below.

(1) At low values of U/V, a turbulent wake exists downstream from the roller, causing high drag in the manner of any blunt-tailed object.

(2) At higher values of U/V, the size of the turbulent wake decreases, reducing drag from that source, but induced drag, caused by pressure escaping at the free tips, becomes large.

(3) The power required to spin the classical *end-disk* is typically much larger than the power required to spin the roller itself.

Analysis and wind tunnel tests at the Holland Corporation have identified and confirmed another aerodynamic difficulty associated with this classical form of the Magnus roller. See item (4) below. Gyroscopic effects have also been evaluated which can become critical when the Magnus roller is applied to a horizontal axis windmill as by Flettner. See item (5) below.

(4) The *spinning* end disk is relatively ineffective for reducing induced drag. The moving surface of the disk itself causes flow circulation. Since this circulation occurs at the free tip it cannot appreciably increase lift. Instead it disproportionately *increases induced drag.* This effect weakens the usual drag reducing effect of an end plate.

(5) When a roller is whirled like the blade of a windmill, attached at its inner end to the horizontal mill shaft of the windmill, standing radially from the shaft and perpendicular to it, it experiences combined rotations, one being rotation around the lengthwise roller axis and the other being around the windmill axis. Consequently, gyroscopic moments are produced, acting to fold the roller back, with its tip moving in the downwind direction.

The Flettner windmill had no structure to resist gyroscopic moments, except internally inside the roller itself. To avoid an energy consuming turbulent wake behind his rollers, Flettner needed a high value of U/V, requiring a high velocity of the roller surface. This in turn required the use of either a large diameter roller, or high roller RPM. Either alternative produces large gyroscopic moments. Consequently, at a reasonably high rate of mill shaft rotation and tip speed, large gyroscopic moments exist, with limited space available for structure to carry those moments. Therefore, Flettner's windmill concept was limited to relatively low wind speed and slow mill axle rotational speed. Under these conditions it was not prevented from delivering strong torque, but it was fundamentally incapable of high efficiency in recovering power because that efficiency requires a high windmill tip speed relative to the wind speed. See W. F. Durand, Aerodynamic Theory, Vol. IV, pages 325-332.

Conventional Practice

The prior art in large conventional wind turbines shows a record of design complexity, excessive blade noise, severe structural loads, loss of aerodynamic efficiency in the natural velocity gradient near the earth's surface and in gusty winds, and sensitive blade reactions requiring shutdown at the higher wind speeds, despite the use of complex machinery to head the machines into the wind and to govern blade angle.

For example, a new carefully designed ten million dollar state-of-the-art project has recently been abandoned, unable to operate a significant percentage of the time at its hilltop site, two blade attachment bolts having failed, ending its brief troubled life.

The lift forces which produce both the beneficial power output and the menacing structural loads on the conventional machine are proportional to the local *angles* of attack at the blade cross sections. Aerodynamic efficiency requires high tip speed ratios; the resultant local wind velocity at a working blade section near the tip is typically the resultant of about ten parts of velocity due to whirling and one part of velocity due to the natural wind. The whirling velocity generates a strong dynamic wind pressure capable of producing destructive aerodynamic forces. The natural wind speed governs those strong forces because it governs the *angle* of attack of the blade section. If the natural wind doubles its speed, as might easily occur when a cold front passes, the flow angle of the resultant wind into the whirling disk doubles. The *lift* on the *blade section more than doubles,* because the initial blade section angle of attack is smaller than the angle of flow into the whirling disk. Lift might easily increase four fold, quadrupling the bending moments on the blade, increasing the risk of blade failure.

If the blade angle of attack is mechanically reduced, the useful power output decreases, and the *sensitivity* of the blade to velocity changes in the natural wind increases. At the reduced angle of attack the lift on the blade may suddenly increase eight-fold or ten-fold due to a gust. But if the blade angle is *not* reduced, a strong increase in the natural wind could stall the blade, creating buffeting which could shatter it. Consequently, the machine must shut down to protect it from damage.

An aircraft responds differently, because it is a free body. It can rise as an upgust is being encountered, relieving the stresses due to that gust. But a wind turbine is held rigidly in place by its tower. It cannot yield downwind.

A wind velocity gradient commonly exists at even the choicest wind power sites with slower natural winds toward the ground, and faster natural winds away from the ground. The conventional rigidly mounted whirling blade of a wind turbine operating in this wind encounters a cyclic change of blade section angle of attack every revolution, even in the steadiest winds. Such a blade experiences cyclic bending moments, cyclic drive train disturbances, and a loss of aerodynamic efficiency as the airfoil sections operate over a range of angles of attack instead of operating at the one best angle of attack. Mechanisms to change blade pitch continuously lead to unacceptable complexities, and costs become prohibitive.

These inefficiencies, costs, risks of structural damage, and incentives to solve the problems by increasingly intricate design confront each other to produce a design dilemma which probably cannot be solved satisfactorily by today's state-of-the-art practices.

As a result, existing machines avoid gusty wind sites and are shut down at any site when strong or gusty winds occur. Or if the site proves to be too gusty, the machine must be dismantled.

There are no examples of which I am aware in the prior art of gust-alleviating wind machines, or self-adjusting features such as a windmill blade which weathervanes freely in pitch. Nor are there references to aerodynamic rollers attached in whirling airfoil type windmill blades, nor to fully articulated machines relieving stresses at each major joint, and being stabilized centrifugally, gyroscopically, or aerodynamically.

One reference, U.S. Pat. No. 1,636,434, J. A. Pinaud, July 19, 1927, uses the centrifugal force on a counterweight type of mass balances on a single blade wind machine to change blade pitch. But Pinaud does not teach any constructions producing gust shedding, stress relief, or aerodynamic performance benefits, so that his construction fails totally in my purposes. He does not teach any construction enabling aerodynamic pitching moments to counter his centrifugal pitching moments to regulate his blade pitch.

The closest reference in the prior art appears to be U.S. Pat. No. Re. 18,122, Anton Flettner, July 7, 1931, in that it teaches combinations of aerodynamic rollers and airfoils for recovering power from the wind, but it does not solve, or even recognize, the problems of excessive aerodynamic drag, especially induced drag, or gyroscopic stresses, and it does not teach any satisfactory means for solving these problems. Instead, Flettner's major windmill project suffered fatal inefficiencies, after which, for more than half a century, the roller windmill appeared to be extinct.

SCOPE OF THE INVENTION

The present invention eliminates the difficulties of the prior art described above.

A fresh approach to wind power is offered, not limited to the opportunities offered by the Magnus roller, but also employing the conventional airfoil section were it serves best.

Mechanical Actions

Mechanical power is transmitted from the wind and made to perform mechanical work when, and only when, a force due to the wind acts on an object, directly or indirectly, and moves that object. The object may be a vehicle, such as a ship which is propelled, or a power shaft which drives a generator to produce electrical power. Only when the ship moves against the resistance of the water or the power shaft turns against a resisting torque is there any production of mechanical power by the wind machine. In every wind power machine there is a series of stress-carrying mechanical joints which join an aerodynamic part of the machine where the wind forces are generated to another part of the machine where the power-generating movement of the machine is produced.

In the wind power machine of this invention, the penultimate joint in this series of joints—the power-generating joint which moves the ship or rotates the power shaft—is the joint shown in FIG. 2. See blade mounting base 3A and blade shank 3B. For a ship this basic stress-carrying, power-generating joint is shown in somewhat more detail in FIG. 7A. For a wind turbine it is shown in FIG. 12. In each of these examples the basic joint is identified as base 3A and shank 3B. Shank 3B may rotate in base 3A but shank 3B is otherwise rigid relative to base 3A.

In the present invention, the power-generating joint carries the entire aerodynamic power output of the blade through a simple compact structure, allowing blade motions which enable the machine to adapt to a wide variety of wind conditions, with high aerodynamic efficiency, without requiring any complex, troublesome, expensive blade control mechanisms.

Aerodynamic and Structural Blade Actions

The recovery of power from the wind is improved by means of an aerodynamic roller, mounted lengthwise in the leading edge of an airfoil-type blade which weathervanes freely in pitch. This blade is applied to a wind ship or to a horizontal axis wind turbine, in proportions which best serve each particular case. In some wind turbines, the roller is omitted but the aerodynamic qualities inherent in the roller are adapted in a novel manner to the airfoil acting alone. Consequently, the wind turbine, in gusty winds, accomplishes reduced structural loading, reduced stresses, and improved efficiency, by means of mechanical articulation throughout, with centrifugal, gyroscopic, and aerodynamic control and stabilization of its components.

A freely weathervaning wind turbine blade having a lengthwise aerodynamic roller in its leading edge produces benefits greater than the simple sum of the individual benefits of roller and airfoil. These combined benefits include improved aerodynamic and structural performance, improved machine control, and general suitability for economical operation in a turbulent aerodynamic environment.

By means of pivoted joints between parts, and the use of "soft," relatively constant, and smoothly varying centrifugal and gyroscopic moments produced by relative rotations, the parts of the machine are governed smoothly but instantly and firmly, largely independent of the erratic turbulence of the wind.

A free pivot eliminates bending stress around that pivot, and other means are then provided to hold the parts correctly aligned. Typically, high speed rotations are used for this purpose, such as blade whirling, producing centrifugal force reactions. High speed rotations have momentum. Since rotational speed must change before centrifugal force can change, applications of force are gentle.

The use of "hard" mechanical systems is avoided. These are subject to shock, vibration, and unacceptable time lags, caused by the massiveness of the mechanical parts needed to force the aerodynamic parts to their controlled positions.

In the roller blade of this invention, the trailing portion of an airfoil is used to streamline the airflow downstream from the roller, to eliminate the strong wake drag experienced by the roller acting alone at values of U/V less than 4.0. The outboard end of the airfoil, consisting of *non-spinning* aerodynamic surfaces beyond the outboard tip of the spinning roller, is used to decrease the severe induced drag experienced by the roller acting alone at high lift coefficients. Either (1) a spanwise continuation of the airfoil surface into the outboard region of the blade or (2) a *non-spinning* plate shielding the end of the roller, attached crosswise to the axis of the roller, outboard of the roller, attached to the airfoil structure (and not attached to the roller) is used in this invention to accomplish a major reduction of induced drag. The spanwise continuation (1) is preferable for a whirling wind turbine blade, because it increases the area of the whirling disk, correspondingly increasing power recovery. The non-spinning plate (2) may be preferable for a particular design of wind ship because a high value of U/V can be produced all the way to the outer end of the blade, so that a roller/airfoil combination cross section profile may be used which is more efficient and more powerful than an airfoil section not employing a roller, and a non-spinning end plate as large as may be required for any particular design may be mounted rigidly on the airfoil, without (a) absorbing any power to spin it and without (b) wastefully generating flow circulation.

By these means the aerodynamic faults of Flettner's construction are corrected: Wake drag, induced drag, and power to spin the roller are all sharply reduced.

The airfoil performs the functions of a "backbone" structural member on which the extended tip or the static end plate are attached, on which the roller is supported, and to which the hub parts (which are forced into movement, generating power) are attached. This airfoil/beam provides adequate structural support against gyroscopic moments which occur when the spinning roller is whirled around the mill shaft as a part of a wind machine blade. As many segments of roller as needed may be used. Each segment of roller is supported at both ends, and the trailing airfoil behind the roller has ample structural moment of inertia. This support permits a relatively small diameter roller to be used, since large internal space in the roller is no longer needed for structural support. The smaller roller diameter decreases gyroscopic moments and results in a high aspect ratio (long slender) form which further decreases induced drag. The support of the roller by the airfoil permits higher spinning velocities, accomplishing the desired high values of U/V, despite the small roller diameter. With the roller supported by the airfoil in short segments, the use of gearing to speed up the roller RPM permits high values of U/V to be accomplished simultaneously with high whirling tip speeds, both of which are essential simultaneously for high aerodynamic performance. The result is a wind machine having values of U/V sufficiently high to produce an aerodynamic performance impossible to achieve in a wind machine using either a roller alone or an airfoil along in its blade.

At high values of U/V, the roller benefits the airfoil aerodynamically. The basic two-dimensional aerodynamic performance ratios for blade profiles, such as $C_l/C_d$ and $C_l/C_d$, can be higher for combinations of rollers and airfoils than for airfoils alone, increasing power recovery performance accordingly. This improved blade section performance has been demonstrated in wind tunnel tests at low Reynolds numbers. The best performance for the roller/airfoil combination always occurs at much higher lift coefficients than for the airfoil alone. This produces the further advantage that the surface area of a roller/airfoil combination is smaller than the surface area of a comparable conventional airfoil blade, producing economies in weight and cost of construction materials.

Due to the variation of the relative wind velocities at successive local blade sections along the blade when the blade is whirling, the highest U/V values on a non-segmented roller occur closest to the hub and the lowest values occur at the outboard end of the roller. This variation of U/V, occurring naturally, accomplishes largely the same effect as the use of taper and twist on the plain airfoil blade, and does so in a simple non-tapered non-twisted structure. Also, because of the favorable aerodynamic action of the roller, the portion of airfoil lying downstream from the roller may be relatively deep in its thickness/chord ratio, strengthening the airfoil. This is a synergistic example: the aerodynamic advantage of the roller improves the structural performance of the airfoil (reduced stresses, deflections, and risks of flutter), and then the airfoil returns a structural benefit to the roller by supporting it.

The roller produces other direct aerodynamic benefits and opportunities: faster roller spinning increases U/V, which improves the performance of the blade. Because of its spin and its rearward surface velocity just upstream of the negative pressure surface of the airfoil, the roller delivers high energy air to the upper surface of the airfoil, assuring freedom from flow spoilage or excessive boundary layer thickening. This enables the roller/airfoil to operate at a high angle of attack, as compared to convetional airfoils, before aerodynamic stalling occurs. Such actions permit simple slender roller/airfoils to perform the functions of conventional blades of greater size, complexity, and weight. They are particularly beneficial toward the root of the blade where the resultant wind velocity is relatively small and flow angles into the whirling disk are relatively steep.

The shape of the airfoil section behind the roller may be tailored by the designer to heighten the effect of U/V. The designer may deliberately increase blade drag at low U/V and seek maximum efficiency at high U/V, so as to make the blade more strongly responsive to a change of roller RPM. If so designed, the wind turbine may be started, speeded up, slowed down, and stopped by simply changing roller spin speed, accomplishing many of the effects of blade angle changes without using any "hard" mechanism to force a change of blade angle. This property may also be used in combination with centrifugal blade angle control for precision blade control.

The most novel and most important benefit of the roller blade in the present invention is as follows:
(1) The spinning roller has the *unique inherent aerodynamic quality* that the strength of its lift force *is not affected* by changes in the angle of attack of the wind, and therefore *the roller does not significantly feel any of the wind gusts which change the angle of attack of a whirling windmill blade.*
(2) In this invention, these same gust-immune qualities of the roller have been adapted to the airfoil blade, by means of a blade weathervaning freely in pitch on a totally free pivot lying lengthwise of the blade forward of the aerodynamic center of the blade, with the angle of attack of the fast-spinning blade controlled centrifugally. This solves the long standing otherwise intractable structural/aerodynamic/complexity problem described above which is inherent in large conventional wind machines having airfoil type blades mechanically controlled in angle of attack.

The "angle of attack" of a spinning circular-sectioned cylinder is meaningless. A circular cross section profile presents the same cross sectional form to any wind in its cross sectional plane no matter which direction the wind comes from. A circle drawn on a sheet of paper is a circle, no matter which way the paper is turned. There can be no "lifting angle", no "angle of attack", no sensitivity to changes of angle of attack.

The *magnitude* of the roller's lift force cannot conceivably be determined by angle. Therefore, the large changes which occur in the strength of the lift force on a conventional airfoil type blade due to small changes of angle of attack simply cannot occur *at all* on a roller used as a wind machine blade.

Even though aeronautical engineers and experimenters have been trying for at least sixty years to alleviate gusts on airplanes and have not succeeded, the elimination of the effects of gusts on wing-like blades on wind power machines is now accomplished:

First, the airfoil is rendered incapable of changing its lift force in response to an angle change in the wind blowing past the airfoil. This is done by eliminating the pitching restraint of the airfoil, by converting it to a weathervane, pivoting around a forwardly located axis.

Next, means are added to replace the natural pitching restraint which has now been removed. This is necessary to force the airfoil to any required angle of attack. It is done in a way which is indifferent to the gusts and angle changes occurring in the natural wind. This is accomplished by using centrifugal moments due to blade whirling, which are not influenced at all by gusts, to force the airfoil to pitch around the free weathervaning axis to the desired angle of attack.

Consider the simplest case, a symmetrical airfoil section having zero pitching moment around its aerodynamic center. The airfoil is mass balanced and freely pivoted around a lengthwise axis well forward of its aerodynamic center. The airfoil will then align itself in a zero lift position, edgewise to any wind which blows past it. The lift force on it does not change; it is always zero. When the slightest lift starts to develop, this lift pitches the airfoil around its free axis, to face the wind, eliminating the lifting angle, and eliminating the lift.

The same immunity to a change of angle of attack occurs with cambered airfoil sections. The aerodynamic force on an airfoil section acts at a point known as the aerodynamic center. On a cambered airfoil section aerodynamic pitching moments are present. All pitching moments on the section act around the aerodynamic center as a couple which is unaffected by blade section angle of attack. It is a principle of mechanics that a couple lying in a particular plane may be applied anywhere on a body with equal results, so that a constant centrifugal couple may be applied to oppose the aerodynamic couple, this centrifugal couple being located on the weathervaning pivot axis upstream from the aerodynamic center, cancelling the effect of the aerodynamic pitching moment, thereby cancelling the effect of the aerodynamic camber, so far as blade section angle of attack is concerned. The cambered airfoil section then responds exactly like the symmetrical airfoil section just described, weathervaning in the same manner.

If the constant centrifugal counter moment is greater or smaller than the aerodynamic pitching moment, the airfoil section will take a corresponding constant angle of attack to the wind producing constant lift acting at the aerodynamic center in the amount and direction to balance the centrifugal pitching moment. Now the airfoil section produces lift, but that lift stays constant so long as the centrifugal pitching moment stays constant (assuming constant wind velocity and air density), and the airfoil section weathervane freely.

Adequate centrifugal moments are available for this purpose on wind turbines. They may be calculated and applied in design by straightforward analysis, as described in more detail in the following sections.

The net practical conclusion is that the roller plus weathervaning airfoil, as compared to the conventional rigidly mounted airfoil, is substantially "not affected" by gusts. This was the experience of the Flettner rotor ship in Atlantic storms a half century ago.

Gyroscopic Actions

The aerodynamic roller, spinning on its central axis and whirling as part of the blade around the mill shaft, generates a gyroscopic moment, $$G = m_r k_r^2 \omega_r \omega_m \qquad (1)$$

where

G, gyroscopic moment, pound feet
$m_r$, roller mass, slugs
$k_r$, radius of gyration of the roller, feet
$\omega_r$, roller spin angular velocity, radians/sec around its central axis
$\omega_m$, roller whirl angular velocity, radians/sec around the mill shaft Expression (1) shows that Flettner's massive, large diameter roller, without external support, must have experienced gyroscopic/structural/aerodynamic problems. The quantities $m_r$ and $k_r$ were large; therefore $\omega_r$ and $107_m$ could not be made large without producing high values of G, so that U/V and tip speed ratio could not be large, preventing good aerodynamic efficiency.

If the spinning aerodynamic roller of the present invention experiences vibration caused by the local gyroscopic moments, the roller may be supported to the blade in short stiff segments, as many as necessary. This was not possible with the Flettner machine; internal space was not adequate and external structure was not present.

Moment G of expression (1) acts to move the outer tip of the roller in the direction in which the natural wind is blowing. The gyroscopic moment due to the spinning roller adds to the aerodynamic moments already present in the whirling blade due to wind pressure across the whirling disk. On Flettner's machine these combined bending moments were resisted structurally at the roller root. In the present invention, these combined bending moments are eliminated by means of a teetering pivot at the blade root. The blade of the present invention whirls fast and the centrigual forces due to whirling are strong, holding the blade close to the perpendicular with the skill axle.

To change the direction of gyroscopic moment G, to oppose, balance, and cancel out the net gyroscopic moment acting on the blade, the same motor which spins the roller may be used to spin a massive additional roller, a "counter roller", typically on the same axis, in the opposite direction of spin. A counter roller may readily be made sufficiently massive with sufficient radius of gyration, and with sufficient spin speed to produce a counter moment equalling the moment due to the spinning aerodynamic roller, particularly on a single blade having a heavy balancing stub in which the counter roller may be located. Such a blade, then, on a teetering pivot will track in a whirling disk as if no spinning roller were present. Internal stresses in the blade locally due to the individual gyroscopic reactions will be carried by the airfoil in its function as a beam.

A wind turbine blade mounted on a teetering pivot at the mill shaft may be made to whirl in a shallow cone-shaped disk by dispensing with the aerodynamic roller, using only a conventional airfoil type blade, in a one blade design with a balancing stub, with a massive fast-spinning counter-roller in the stub, spinning on an axis lengthwise to the blade. "Counter-spinning" (oppositely in direction to the aerodynamic roller if one were present) will produce a whirling disk which is concave toward the wind. Preliminary tests in the Holland Corporation wind tunnel indicate that there are substantial gains in the aerodynamic performance of such a wind turbine due to its forwardly facing concave form. It is ordinarily difficult to balance or support a whirling blade in a whirling disk which is concave forwardly without dynamic problems. These are not present when the concavity is produced gyroscopically, as just described.

Stress Relief in a Free Dynamic Support System

On a conventional wind turbine, a *rigidly mounted single blade*, being aerodynamically unsymmetrical, would experience severe transient loads in gusty winds, with severe loadings in the bearings and dynamic interactions throughout the supporting structure.

In any *conventional* wind turbine the various parts are held "rigidly" in place—the angle of pitch of the blade, the blade root attachment to the mill shaft, and the horizontal mill shaft to the mast. Yet, despite this attempt at "rigidity", the result would be more accurately described as "springiness."

All the parts deflect elastically, and every deflection is accompanied by stresses in the materials. The external forces make the mass of the structure spring one way, and the stresses make the mass spring back, potentially producing vibrations. The blades twist and bend, the whirling blade yaws with a change of wind direction and exerts gyroscopic moments on the mill shaft, and the blades bend and flap cyclically as they pass through the vertical dissymmetry of the wind stream due to the presence of the ground, and through the turbulence and velocity losses downstream from wind obstructions. On gusty days or at gusty sites, the wind is a swirling turbulent mass, with instantaneous variations beyond description, always agitating any sensitive, springy aerodynamic blade.

On the present invention, the conventional problems of the single blade are largely solved by the use of a teetering pivot at the blade root, which allows the blade to yield to the wind velocity gradient, to sudden gusts, and to gyroscopic pitching moments, nose up or nose down, produced when a whirling blade is suddenly yawed to face a changed wind direction. No root bending stresses are produced in any of these circumstances. This action interrupts transmission of bending stresses to the mill shaft, to its housing, to the joint at the top of the mast, and to the mast and its supports.

Yet, ice on the blades, flying off in chunks, unbalance due to any of a myriad of causes, even rain on a one-blade machine, can produce unbalanced eccentric loads, rotating at blade whirling frequency, acting radially outward at the mill shaft. In practical low cost wind turbine operations, unattended and with minimum maintenance, it appears certain that a one-blade wind turbine will be somewhat out of balance at one time or another. Yet to realize the full advantages and economies of the invention, a single blade design is preferable to a multiple blade design. Therefore a novel mounting structure to accomodate blade unbalance is a significant component of this invention.

The teetering pivot at the blade root is only a part of a larger free pivoting dynamic system which assures against destructive stresses due to severe weather. Stresses and "springiness" are removed by the use of free pivots at every major joint, and maximum structural rigidity is maintained between joints. Blade pitch, blade root attachment to the mill shaft, and the alignment of the horizontal mill shaft relative to the top of the mast are all freely pivoted. Mass balances are used to avoid dynamic mass eccentricities around axes of rotation. In such a structure large deflections may occur at the joints, but they are not accompanied by the large stresses which are the fundamental cause of material failure.

The free dynamic support system of a horizontal axis wind turbine made according to this invention consists of the single blade, the mill shaft mounted in the body, the support mast, and pivoted joints between these parts. The blade, shaft, body and support mast are comparatively rigid; the joints between the parts are freely pivoted. The single blade is mass balanced and freely pivoted around a lengthwise pitching axis well forward of the aerodynamic center of the blade. The blade is mass balanced around the mill shaft by means of a stub, and is pivoted to the mill shaft on a freely teetering pivot perpendicularly intersecting both the lengthwise blade pitching axis and the mill axis, and is mass balanced around the teetering axis. The mill shaft turns in bearings rigidly mounted in the body. The body is freely pivoted in yaw and pitch at the top of the support mast. The body and its contents, and the blade at one extremity of the body, all is taken as a whole, are mass balanced around the mast support point by means of a weight at the end of the body opposite the blade end. The center of gravity of the body with its total parts is located slightly below the body support point at the top of the mast, so that the body hangs in a horizontal position when there is no wind. On the body downwind from the mass support joint, vertical and horizontal tail surfaces, or their aerodynamic equivalents, are attached to the body so that it points into the wind, even when the wind is not horizontal.

This dynamic system eliminates all extraneous dynamic reactions by means of mass balancing of the individual parts. It cancels major bending moments at each joint between parts, eliminating the transmission of all major bending stresses across joints. In concentrates rigidity in the parts and deflections in the joints, greatly reducing deflections due to the stressing of materials and "springiness" due to such stressed material.

The parts are kept aligned to the natural wind by the aerodynamic forces acting on the tail surfaces, and by the balancing of gyroscopic, centrifugal and aerodynamic forces and moments.

On such a system, the parts may be designed to remain in balance in all conditions of wind and weather except that the single blade may be temporarily out of balance, principally due to ice. The blades would be surfaced with non-stick non-wetting materials, on which drops of water bead up due to surface tension and fly off. Heat deicing becomes relatively practical because of the reduced surface area of the fast moving single blade and the strong centrifugal forces which act continuously to keep the blade surface clean.

This dynamic support system enables the machine to operate efficiently even though the single blade is out of balance. The system is determinate from a design standpoint. That is, any assumed amount of blade unbalance due to ice on the blade may be carried through a straightforward design process which determines the sizes of all parts needed to tolerate the loadings without excessive stresses in any part, assuring freedom from damage or excessive wear.

No attempt is made to prevent oscillations of the body, but only to keep the stresses low and avoid *unstable* oscillations. For example, assume that a particular machine is operating at 200 RPM, or 3.33 revolutions per second. When the blade is out of balance, the blade end of the body experiences a rotating radially outward force, causing the end of the mill shaft to move in a circle in a plane normal to the shaft axis. The horizontal (or vertical) component of the driving force reverses direction twice each revolution, or 6.66 times per second. Even though the body is balanced on a free horizontal (or vertical) pivot, it will not swing out of line very far in about 1/6 of a second, after which the motion reverses. If the displacement is considered to be excessive, it may be reduced by increasing the mass moment of inertia of the body.

The balancing stub on the single blade contributes directly to a large mass moment of inertia of the balanced body. As the stub is made shorter its weight must become greater. This increased weight at the blade end of the body requires increased balancing weight at the opposite end of the body. These weights increase the mass moment of inertia of the body and reduce the wobbling motion of the body when the single blade is out of balance.

No critical limit intercedes in this process; the design accomodates a temporarily unbalanced blade. Large amounts of blade unbalance can be made acceptable if large moments of inertia of the body and appropriately designed bearings and detailed structures are employed.

The body between the blade hub and the tail surfaces, balanced neutrally in pitch and yaw at the top of the mast, may be designed structually to accept the full range of dynamic loadings and temporary misalignments which are to be expected in severe weather. Although disturbing forces swing the mill shaft somewhat out of line with the wind, the tail surfaces act continuously to swing the shaft back into line and to damp any oscillation. This corrective action occurs whether the blade hub joint moves side to side in yaw, or up and down in pitch, or in any combination of these motions.

These actions cooperate with the gust shedding properties of the weathervaning blade. The machine built according to these principles will accomplish practical relief of stresses due to gusts, in all its parts, at all times, regardless of weather conditions.

Principles of Aero-Centrifugal Control of Blade Angle of Attack

In this specification where airfoils, airfoil sections, and blade sections are described, the word "upper" refers to the negative pressure side, and "lower" refers to the positive pressure side, as on an airplane wing, and the drawings are usually positioned that way.

FIGS. 1A through 1E and the descriptions below explain the aerodynamic center of airfoils, the location of a free pivot axis which permits free pitching weathervaning of such airfoils, and the use of mass/centrifugal moments to control the angle of attack of these airfoils. The interactions of these elements automatically control blade angle of attack to substantially constant values. Even though a wind gust changes the angle of the resultant wind velocity, the blade angle changes to follow the wind direction, maintaining essentially constant lifting angle. This "aero-centrifugal" action must be understood if the preferred embodiments of the invention, which follow, are to be understood. Therefore, these principles are presented in some detail.

The principles are illustrated and formulated for airfoil type blades without rollers, for which aerodynamic section properties have long been established to a high degree of precision. We may be confident that basically the same results are accomplished by the roller/airfoil blade. This is consistent with aerodynamic theory, and field tests of roller/airfoil blades operating in the natural wind have consistantly demonstrated satisfactory free weathervaning of the roller/airfoil blade.

The upper part of FIG. 1A is a conceptual perspective sketch of the operating parts and their relationships to each other, to the direction of the natural wind, $V_o$, the direction of the resultant wind, $V_R$, at the blade, and the positions of the mill shaft, m.a., in optional alternate positions m.a.$_1$ and m.a.$_n$, and the free weathervaning pivot axis, p.

Figure 1B:
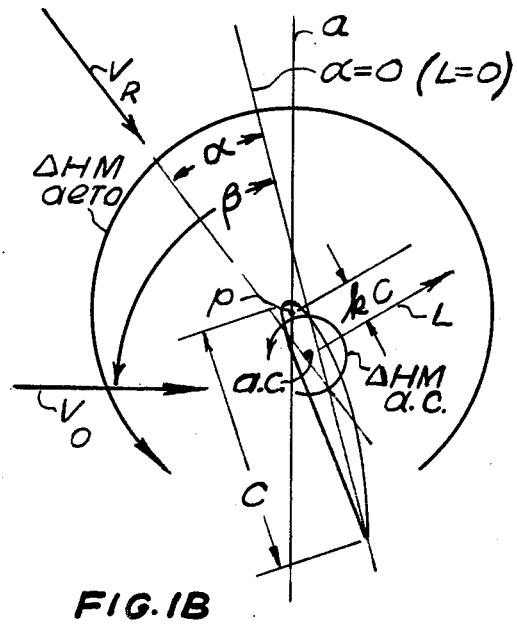
Figure 1C:
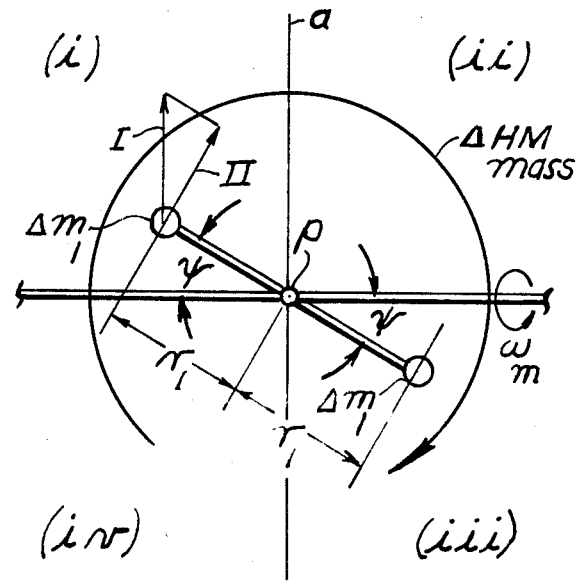

FIGS. 1B and 1C show respectively the aerodynamic and centrifugal pitching moments opposing each other around the free weathervaning axis of the blade.

FIG. 1B is a view at B—B of FIG. 1A, showing the aerodynamic quantities producing a "*nose-down*" moment on a representative segment of the blade.

FIG. 1C is a view at C—C of FIG. 1A, showing the centrifugal quantities simultaneously producing a "*nose-up*" moment on the blade.

Figure 1D:
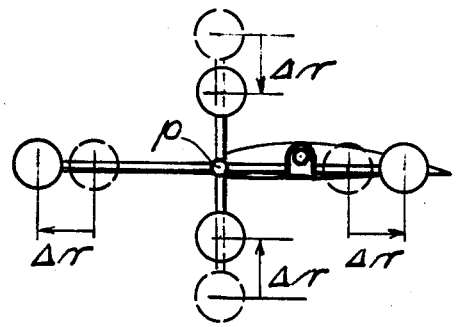
Figure 1E:
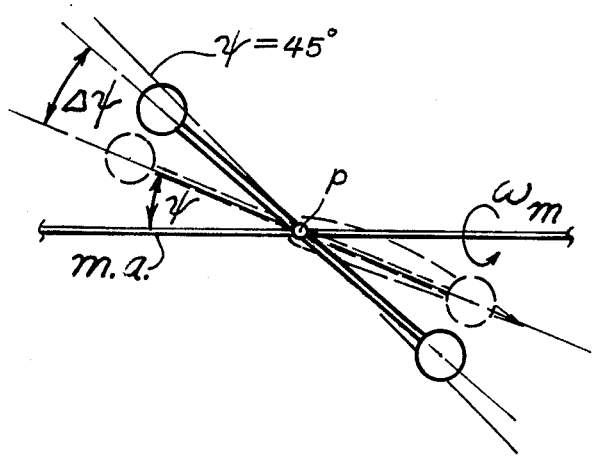

FIGS. 1D and 1E illustrate two methods among several possible methods for varying the geometry of the centrifugal masses relative to the blade section and the mill axis, for adaptation to mechanisms for varying the centrifugal moments acting on the blade.

The Free Weathervaning Pivot and the Aerodynamic Center of the Blade

The airfoil blade must weathervane freely if it is to be immune to the effects of gusts.

It is well established that any airfoil section in non-stalled two-dimensional flow produces a resultant aerodynamic force on the section at the point called the "aerodynamic center" or "a.c.". For test data showing the aerodynamic centers of a wide variety of airfoil sections, see NACA Reports 628 and 824.

Around this aerodynamic center the moment coefficient of the airfoil is constant. The following relationship applies:

$$\Delta HM_{a.c.} = C_{ma.c.} \cdot \tfrac{1}{2}\rho V_R^2 \Delta b C^2 \qquad (2)$$

where $\Delta HM_{a.c.}$, pitching moment on a two dimensional airfoil segment around its aerodynamic center, lb. ft.

$C_{ma.c.}$, moment coefficient around the aerodynamic center, constant for any given airfoil section $\rho$, atmospheric density, slugs/ft. (0.00238 at sea level, standard)

$V_R$, resultant airflow velocity approaching the segment, ft./sec.

$\Delta b$, spanwise length of the two dimensional airfoil segment, ft.

C, constant chord of the two dimensional airfoil segment, ft.

From expression (2) it may be seen that for any local cross sectional segment of a wind machine blade having a specific airfoil section, with a specific blade chord C, operating at a specific resultant wind velocity $V_R$, at any given instant ($\rho$ is constant), all of the quantities are constant, so that the aerodynamic pitching moment on the blade section around its aerodynamic center is constant. The angle of attack of the blade section does not appear in expression (2). This means that the blade section may change its blade angle, so long as it does not stall, and the pitching moment acting on the blade section *around the aerodynamic center* will not change. It is not influenced by angle of attack.

To cause this airfoil section to weathervane in a regular and predictable manner it is only necessary to pivot the section on a spanwise axis which lies *upstream from the aerodynamic center.* So pivoted, the pitching moment on the section around its forward pivot consists of the sum of (a) the pitching moment of expression (2), just described, and (b) the moment around the *new* forward pivot position caused by the resultant aerodynamic force acting at the aerodynamic center. *Pitching moment* (b) is the product of this resultant aerodynamic force times the length of the moment arm from the resultant aerodynamic force, acting through the aerodynamic center, to the free pivot. This pitching *moment is not* constant. The resultant aerodynamic force at the aerodynamic center consists almost entirely of lift, and *lift is proportional to the aerodynamic angle of attack, $\alpha$,* of the section.

Around the free pivot which lies forward of the aerodynamic center, stable weathervaning moments are produced. If the airfoil section is riding freely on its forward pivot and it is arbitrarily forced to an increased angle of attack, the lift force increases, producing an increased nose-down pitching moment. If the airfoil section is then released, this nose-down pitching moment decreases the angle of attack, restoring the airfoil section to its previous free-trailing position. The blade weathervanes reliably, operating on the same basic principles as the common wind vanes seen on barns.

These principles may be stated explicitly, enabling calculations to be made for any situation of interest. See, on FIG. 1B, a cross section diagram of a cambered airfoil blade corresponding to expressions (2) above, and (3) below. Point p is the endview of the freely weathervaning pitching axis. Point a.c. is the aerodynamic center of the airfoil section. Line "a" is the position of the whirling plane of the blade, perpendicular to the mill axis.

For small angles of attack, always smaller than the stalling angle, using $\cos \alpha = 1$, $$\Delta HM_L = kCL = -kC \cdot C_1 \tfrac{1}{2}\rho V_R^2 \Delta bC$$

from which, substituting expression (2) and the quantities defined below, and re-arranging, the total aerodynamic pitching moment is $$HM_{aero} = (C_{ma.c.} - 0.1097 k\alpha)\tfrac{1}{2}\rho V_R^2 \Delta b C^2 \qquad (3)$$

where, in addition to the quantities defined above, $\Delta HM_L$, pitching moment on the two dimensional airfoil segment due to the lift force, L, around a pitching pivot kC feet forward of the aerodynamic center of the segment, lb. ft.

$\Delta HM_{aero}$, the total aerodynamic pitching moment on the segment around the forward pitching pivot, $\Delta HM_{a.c.} \cdot \Delta HM_L$ L, lift force, lb., $C_1 \cdot \tfrac{1}{2}\rho V_R^2 \Delta bC$ k, distance in airfoil chord lengths that the pitching pivot lies forward of the aerodynamic center of the segment $C_1$, lift coefficient, two dimensional, $C_1 = 0.1097\alpha$, not stalled $\alpha$, angle of attack of segment, measured from the *aerodynamic zero lift line* of the airfoil section in two dimensional flow, to the local resultant wind direction, degrees Notes:
Pitching moments due to the profile drag of the airfoil section acting at the aerodynamic center are sufficiently small to be neglected.

Conventions for signs are as follows: See FIG. 1B Counterclockwise moments as shown are negative. Angle of attack as shown is positive. Angle of attack is measured from the aerodynamic zero lift line of the section, *not* from the chord line of the section.

An airfoil section cambered as shown has a negative pitching moment coefficient.

In addition, in FIG. 1B and throughout the discussion, $V_o$, remote natural wind velocity, ft./sec.

$\beta$, blade angle, degrees, *the angle between the remote natural wind direction $V_o$ and the blade section aerodynamic zero lift line. Notice that this angle $\beta$ is not* measured relative to the whirling plane as is customary with propellers.

When FIG. 1B is applied to a roller/airfoil section, point p is ordinarily the spinning axis of the roller.

From expression (3) and FIG. 1B, noting that the moment coefficient, $C_{ma.c.}$, of the cambered airfoil as shown is negative, and that the angle of attack as shown is positive, it may be seen that the total aerodynamic moment on the section is negative, or counterclockwise, when the angle of attack $\alpha$ is positive, and that a larger positive angle of attack (counterclockwise shift of the direction of the wind, $V_R$) causes the counterclockwise aerodynamic moment to increase.

More specifically, when the local resultant wind direction $V_R$ shifts counterclockwise, increasing the angle of attack $\alpha$ of the blade section (with the magnitude of the wind velocity $V_R$, the direction of the remote wind velocity $V_o$, and blade angle $\beta$ remaining constant), the lift L on the section increases in proportion to $\alpha$, and the nose-down pitching moment on the section increases accordingly.

Now, we repeat this action with the difference that blade angle $\beta$ is now free to decrease but is prevented from doing so at the start of the action by a *constant* nose-up pitching moment, not shown, equal and opposite to the initial nose-down pitching moment on the section. As before, the tendency for the angle of attack α to increase due to a gust is accompanied by a tendency for lift L to increase, but now the *increased* nose-down pitching moment on the blade exceeds the *constant* nose-up restraining moment. The blade section, then, pitches nose down (counterclockwise) at almost the same instant that the direction of $V_R$ starts to rotate counterclockwise, reducing α, continuously balancing the moments. When $V_R$ ceases changing direction the moments on the section will almost instantly balance again. Both the local resultant wind direction and the blade section will have moved through the same angle.

In other words, the alignment of the airfoil section follows the alignment of the wind direction.

Physically, this is as simple as a flag on a flag pole, or a stiff plate of the same general shape as the flag, hinged to the flag pole near its front edge. The flag, the hinged plate, and the airfoil all weathervane freely.

When the airfoil section is held at a positive angle of attack, the aerodynamic pitching moment acting on the blade of this invention always acts to make the blade nose down to decrease its lift.

(a) The lift always acts at a point rearward of the pivot axis, producing a nose-down moment. This dominates the action.

(b) The effective camber of the airfoil section, concave "downwardly" for aerodynamic efficiency, produces a nose-down pitching moment around the aerodynamic center, so that this also produces a nose-down moment. (This moment remains constant at constant wind speed, regardless of angle of attack.)

These are well established fundamental principles. Whatever applies for one short span segment of a blade individually applies as well for the aggregate integrated action of all the short span segments over the entire span of the blade, mathematically summed up by well known methods.

Expression (3) provides the design relationships needed for any operating condition, whether the blade is whirling or stationary. If the straight lengthwise pivot line of the blade lies *forward* of the net effective aerodynamic center of the entire blade in any prevailing operating condition, the blade will *weathervane* in pitch in a *stable* manner in that operating condition. But if the pivot line passes *through* the aerodynamic center, the blade will be neutral, without any consistent pitching tendency. If the pivot line lies *rearward* of the aerodynamic center, the blade will be *unstable;* it will flip over in pitch, either nose up or nose down in an erratic manner.

The magnitude of the stable pitching moment on the blade increases in proportion to the distance, kC, between the net effective aerodynamic center of the blade segment and the forward pivot line. The design location of the forward pivot is therefore a matter for design analysis, but it will always lie clearly forward of the mean effective aerodynamic center of the blade.

In practical design, a margin of conservatism is desirable to protect against the possibility that extraneous weight such as ice might be present on a blade in a rearward position causing the center of gravity of the blade to move too far *rearward.* The blade, being freely pivoted at the root, both in pitching and in teetering, responds to a *dynamic* pitching axis lying on a line connecting the center of the teetering bearing pivot and the center of gravity of the blade. This *dynamic* axis must pass forward of the aerodynamic center of the blade in all operating conditions. When the blade is not thrown out of balance by extraneous mass, the apparent pivot axis and the dynamic axis coincide because of the way the blade is balanced in design. See FIGS. 9, 12, and 15, and the section "Dynamic Weathervaning Axis," below.

The aerodynamic centers of all airfoil sections lie close to the "quarter chord" point of the section, that is, at the point "0.25C", one-quarter of the chord distance from the leading edge of the section toward the trailing edge of the section. On a straight linearly tapered blade, a line connecting all the aerodynamic centers of the sections is straight and lies close to the quarter chord line (0.25C), midway between the planview centerline of the blade (0.50C) and the leading edge of the blade (0.0C).

The location of the pivot line required in this invention to produce proper weathervaning may be described in several ways; such as "forward of the effective quarter chord line of the blade," or "forward of the median line of the forward half of the planform area of the blade," or "closer to the leading edge of the blade than to a line midway between the leading edge and the trailing edge of the blade," or "forward of the net effective aerodynamic center of the blade."

In the prior art, any conventional blade having a lengthwise pivot axis intended for a non-weathervaning change of blade angle typically has a pitching pivot axis somewhere in the range of 0.30C to 0.55C. Such axes have the different purpose of keeping the aerodynamic pitching moments *small* so that they do not greatly affect *mechanically forced* blade angle changes. These conventional blades must be forced to new positions in pitch; they do not pivot freely in response to the aerodynamic forces acting on them. No such conventional axis position can be mistaken for a free-pivoting weathervaning axis position as used in the present invention, because all such conventional pivoting axes would be clearly unstable if allowed to pivot freely.

The aerodynamic pitching moment acting on the blade, as described above, of itself causes the aerodynamic blade to nose down (to reduce its angle of attack). A nose up moment may be applied to balance this aerodynamic moment. That moment may be supplied centrifugally. The net aerodynamic moment may be computed from expression (3), using well known design methods, for any blade design with any airfoil section, with any setting of a trailing edge tab, at any whirl speed in any natural wind speed, around any trial pivot axis p. The balancing nose-up centrifugal moment may be computed from expression (4), below.

Roller Action Affecting Weathervaning

On machines using roller airfoil blades there is an action producing aerodynamic effects in addition to those of conventional airfoils just described. An increase of roller speed, which increases U/V, increases section lift and decreases section drag at constant angle of attack, and usually increases the free-trailing angle of attack, further increasing lift, producing results somewhat resembling centrifugal results, described below. These characteristics, for a particular roller/airfoil profile, may be adapted by design to a bladeangle-changing lift control system based on the control of roller RPM. This combines well with the centrifugal system, because it operates most effectively at the slower mill whirling speeds where the centrifugal action is weakest, producing powerful effects for starting the machine whirling from a fully feathered free trailing blade position.

Centrifugal Blade Angle Control

Pitching moments are exerted on the weathervaning blade by centrifugal masses to balance and oppose the nose-down aerodynamic pitching moments described above. These pitching moments stay essentially constant over any short period of time, so that the blade may pitch correctively when it encounters a gust, to produce the desired constant or gently varying true aerodynamic angle of attack of the blade.

FIG. 1A illustrates the aerodynamic/centrifugal interaction of the blade. At the right end of the upper diagram, at view B—B, is the aerodynamic action illustrated in FIG. 1B, just described. At the left end, at view C—C, is the centrifugal action illustrated in FIG. 1C. These two sources of pitching moment action are interconnected by structure which is shown on the diagram as a torsion shaft lying on weathervaning axis p.

Axis p stands perpendicular to the horizontal mill axis of the machine, which is indicated on FIG. 1A as "m.a.$_1$" or "m.a.$_n$". The blade whirls around one or the other of these axes, counterclockwise on the diagram, generating a component of wind velocity at the aerodynamic end (FIG. 1B) and generating radial centrifugal reactions perpendicular to the mill axis at every element of mass in the blade, the effect of which is shown diagrammatically at the centrifugal end (FIG. 1C).

The generalized positions of the mill axis, m.a.$_1$ and m.a.$_n$ shown in FIG. 1A, indicate an unlimited number of alternate positions which perform identically so far as centrifugal pitching moments around axis p are concerned. Position m.a.$_1$ is diagrammatic for a one-blade machine with a balancing stub; the mill axis lies between the stub and the aerodynamic portion of the blade. Position m.a.$_n$ is diagrammatic for a machine having 2, 3, or any number of blades; the mill axis lies at the extreme left end of diagram 1A; the centrifugal action is accomplished by the same mass distribution as before, when viewed as in FIG. 1C, but now the centrifugal masses lie entirely on the aerodynamic side of the blade; balance around the mill shaft is accomplished by an additional identical blade or blades attached symmetrically and radially in the whirling plane around the mill shaft.

In FIG. 1A *centrifugal* pitching moments (FIG. 1C) (in the "nose-up" direction) act in the direction to increase the aerodynamic angle of attack of the blade, and *aerodynamic* pitching moments (FIG. 1B) (in the "nose-down" direction) act to decrease the aerodynamic angle of attack of the blade. The net resultant of these opposing actions, varying as the conditions of operations vary, constitute a blade pitch adjustment means which is free of any directly applied "hard" mechanical moments, such as conventional gear-driven or hydraulically-driven blade pitch control systems.

The basic centrifugal action, of itself, by increasing the angle of attack of the blade, caused blade lift to increase, thereby increasing RPM, which in turn, by centrifugal action, further increases blade angle, continuing to increase RPM, until a limit is reached. This limit may be any one of, or combinations of, several effects:

(a) The centrifugal moments decrease as the angle $\psi$ increases from 45 degrees to 90 degrees. (See FIG. 1C, 1E, and expression (4), below. Sin $\psi$ cos $\psi$ is maximum at $\psi = 45$ degrees.)

(b) The angle of attack $\alpha$ approaches the stalling angle, and the aerodynamic drag of the blade increases, interrupting the growth of RPM.

(c) An increase of torque load on the mill shaft prevents further increase of RPM. Further increase of torque then reduces RPM, and the blade angle $\beta$ (see FIG. 1B) decreases, keeping the blade at an efficient aerodynamic angle. The blade pitch adjustment operates automatically in response to variations of torque load.

(d) In very strong winds, in the event that none of the above occurs, as in a malfunction of a control system intended to adjust the positions of the centrifugal masses, or in a design having no such adjustment, there is a possibility that excessively high RPM could develop, to the point of blade failure in whirling tension. As a catch-all safety measure to prevent this, and as a means to continue to develop power in strong winds, a spring pre-loaded in tension is indicated diagrammatically in FIG. 1A which limits the amount of nose-up torque which can be transmitted from the centrifugal action (FIG. 1C) to the aerodynamic blade (FIG. 1B). (In FIGS. 15, 16, and 17, a functionally equivalent spring is pre-loaded in torsion.)

The upper diagram in FIG. 1A shows the pre-load spring holding the interconnecting shaft torsionally rigid, and the lower partial diagram shows the pre-load spring stretched, allowing the airfoil portion of the blade (FIG. 1B) to reduce its angle of attack relative to the centrifugal portion of the blade (FIG. 1C).

In high wind speeds at relatively light mill shaft loadings, the torsion shaft between the centrifugal and airfoil ends of the blade can reach a limiting torque which stretches the preloaded spring. Beyond that point further nose-up movement on the centrifugal end does not produce a full measure of nose-up movement on the airfoil side. The centrifugal side moves toward $\psi = 90$ degrees, decreasing the centrifugal moments due to $\psi$ toward zero, while the aerodynamic side no longer drives the whirling with a full measure of increased lift toward a higher RPM, so that the increase of RPM tapers off and becomes constant. Yet power continues to be delivered.

The runaway situation is prevented, even in winds of hurricane force, without any need for decision or action by any human attendant.

In FIG. 1C, point p is the end view of the freely weathervaning pitching axis p, as before. The mill axle is indicated by "m.a.". The angle $\psi$ lies in the plane of the paper, perpendicularly intersecting the free weathervaning pivot axis p; $\psi$ is the angle between the straight line passing through the centers of gravity of masses $\Delta m_1$ and through axis p, and a second line in the same plane through axis p lying parallel to the mill axis m.a.

Note 1: In FIG. 1C, the radial centrifugal forces acting around the mill axle have been projected as components onto a plane through the mill axle perpendicular to axis p, since only these components affect the moments due to these forces around axis p.

In comparing FIG. 1B and FIG. 1C, it may be observed that a "nose-up" pitching displacement of the airfoil section (FIG. 1B), with the direction of the resultant wind $V_R$ unchanged, causes an increase of angle of attack $\alpha$ and pitch angle $\beta$, and it also causes an increase in $\psi$ (FIG. 1C). When the preload torque has not been reached, the airfoil of FIG. 1B is rigidly attached to the masses of FIG. 1C, and both rotate around the same axis p; therefore the increase of $\psi$ equals the increase of $\alpha$ (or $\beta$).

$\Delta\psi = \Delta\alpha$ $\Delta\psi = \Delta\beta$ (if spring pre-load is not exceeded)

From FIG. 1C it may be seen that any small element of mass, $\Delta m_1$ slugs, lying at a distance $r_1$ feet from axis p at an angle of $\psi$ degrees to mill axis m.a., whirling around the mill axis at $\omega$ radians per second, contributes a small element of hinge moment $\Delta HM_{mass}$, to the total hinge moment around axis p (clockwise moments being positive), as follows:

Consider only the single element of mass $\Delta m_1$, lying in the upper left hand quadrant (i):

As shown on the diagram:

Force $I = \Delta m_1 \omega_m^2 r_1 \sin \psi$ — the centrifugal reaction

Force component $II = $ Force $I \cdot \cos \psi$ — the moment-producing component of Force I around axis p Moment around $p = \Delta HM_{mass} = $ Force component $II \cdot r_1$ Therefore, $$\Delta HM_{mass} = \Delta m_1 \omega_m^2 r_1^2 \sin \psi \cos \psi \qquad (4)$$

For elements of mass lying in quadrant (i) and (iii) of FIG. 1C, the hinge moment contributions are "blade flattening" (positive, clockwise). For elements of mass lying in quadrants (ii) and (iv) the contributions are "anti-blade-flattening" (negative, counterclockwise).

From expression (4), the hinge moment contribution of *any* individual eccentric elemental mass at any location of $\psi$ and $r$ may be calculated.

The total hinge moment, $HM_{mass}$, produced by all the elemental masses $\Delta m$, as they are distributed in the blade by design, is determined by summation.

All masses along the entire length of the blade react as just described, ragardless of their lengthwise positions. See Note 1, above. This fact permits the centrifugal effects to be presented in a single plane, as in FIG. 1C, 1D, or 1E, viewed along the weathervaning pivot p.

In this discussion (FIG. 1C) a "balanced pair" of masses consists of two identical masses ($\Delta m_1$) located on a straight line through axis p, lying in a plane perpendicular to axis p; each at the same distance ($r_1$) from axis p, and therefore each at the same angle $\psi$ from the mill shaft axis of rotation (m.a.). Also see FIGS. 1D and 1E.

This symmetrical arrangement, this "balanced pair," is useful for control mechanisms for changing the total centrifugal hinge moment acting on the blade without affecting the static balancing of the blade, either around axis p or around mill axis m.a. Changes of r are illustrated in FIG. 1D and changes of $\psi$ are illustrated in FIG. 1E.

Such a balanced pair, each of $\Delta m_1$ slugs, each $r_1$ feet from p, whirling around the mill shaft at an angular velocity of $\omega$ radians per second, produces a couple of $\Delta HM_{mass}$ lb. ft. around axis p. From expression (4), $$\Delta HM_{mass} = 2\Delta m_1 \omega_m^2 r_1^2 \sin \psi \cos \psi \qquad (5)$$

(balanced pair)

The arrangement in FIG. 1D shows two balanced pairs arranged at right angles to each other. In this position, when the angle of the blade changes such that one balanced pair lies in quadrants (i) and (iii) of FIG. 1C, for example, the other balanced pair will be in quadrants (ii) and (iv). See FIG. 1C. Thus, the first balanced pair will produce a nose-up (clockwise, positive) centrifugal moment and the other balanced pair will produce a nose-down (counterclockwise, negative) centrifugal moment; the pairs oppose each other. If the product $mr^2$ of the two perpendicular pairs is equal (see expression (5)), the total action will be neutralized, the opposing moments will be equal, and no net pitching hinge moment will be delivered to the blade by this orthogonal arrangement of two equal balanced pairs.

It may be observed, consequently, that axially concentric distributions of mass, centered on the pitching axis p, such as circular sectioned tubing, shafting, aerodynamic rollers, gyroscopic countermasses, and electric motor armatures and most stators and casings, are equivalent to the centrifugally neutralized perpendicular balanced pairs just described, so that they produce no centrifugal moments around weathervaning axis p.

As shown in FIGS. 1D and 1E, r and $\psi$ may be varied to produce any desired hinge moments to balance the moments exerted aerodynamically on the blade, for control of blade angle of attack. As shown in FIG. 1E, by means of control of angle $\psi$, the centrifugal hinge moments may be controlled from maximum (45 degrees) to minimum (0 and 90 degrees) as required. ($\sin\psi\cos\psi$ of expression (5) is maximum at $\psi = 45$ degrees, and is zero at 0 and 90 degrees.)

The blade, whirling around the mill axis and riding freely on weathervaning axis p takes an angle of attack in which the net pitching moments around that axis are balanced and equal to zero. The static weight of the blade is balanced around axis p and produces no moment.

Remembering that the centrifugal moment as illustrated in FIGS. 1A and 1C acts to increase the blade's angle of attack, and the aerodynamic pitching moments in FIG. 1B act to decrease the angle of attack:

To increase the blade angle, when a balanced pair of masses is in quadrants (i) and (iii) of FIG. 1C, the centrifugal moments may be increased by increasing r, and/or by changing $\psi$ to a value closer to its maximum moment position at $\psi = 45$ degrees. When the balanced pair is in quadrants (ii) and (iv), results are opposite; the blade angle is decreased by these changes.

Free weathervaning blades may be designated with fixed mass positions providing automatic blade angle control in a particular range of operating conditions. Or, movable masses may be used, changing r (FIG. 1D), or changing $\psi$ (FIG. 1E), or changing both r and $\psi$, so that a programmed microprocessor can operate the machine precisely for any specified operating requirements. The microprocessor may make small blade angle changes to search continuously for the maximum product of torque and RPM to produce maximum power, or it may adjust blade angle continuously to hold precise RPM, or it may limit maximum RPM, or it may detect unbalance due to ice and activate de-icers, or it may detect starting or stopping conditions, and control the machine through the prescribed procedures.

In the "natural" distribution of mass in the blade, the center of mass of the airfoil lies roughly in the chord plane of the blade on the downwind side of axis p, and the static balancing of the blade (masses 6A and 6B in FIGS. 2, 7, 9, 12, and 15) locates additional mass forward of axis p in the same plane. This natural distribution of mass causes the blade to "flatten" (to bring the blade's chord plane closer to the plane of the whirling disk) as it whirls around the mill shaft. When this blade is edgewise to the wind ($\beta = 0$ degrees), as at $\psi = 0$ in FIG. 1C, no centrifugal pitching moments are produced. But if the blade is initially at an angle of attack, or if roller 1 is spinning, a lift force will start the blade whirling, a small nose up centrifugal pitching moment will be produced, increasing as whirling speed increases. The centrifugal masses move into quadrants (i) and (iii) of FIG. 1C. The effect of $mr^2$ reaches its peak at $\psi = 45$ degrees, but $\omega$ continues to increase beyond 45 degrees, so that a stable balance develops between $\omega$ and $\psi$, the point of equilibrium of which is at higher values of $\omega$ as torque is smaller, and at lower values of $\omega$ as torque is greater, affected in addition by the increasing strength of the nose down aerodynamic moment as $\omega$ increases.

These opposing trends may all be stated mathematically for programmed computation, for any centrifugal mass distribution, permitting specific performance to be computed for specific designs, loadings, and operating conditions.

When the positions of the centrifugal masses are to be changed for blade angle control, the blade may be designed to be centrifugally neutral overall, and a balanced pair of "anti-flattening" masses standing perpendicular to the chord plane may be drawn in toward axis p to produce blade flattening (FIGS. 12 and 13). Or a balanced pair of "flattening" masses in the chord plane may be moved away from axis p to get the same result (FIG. 15). Or, both of these balanced pairs may be used (FIG. 1D). Or the angle $\psi$ may be changed (FIG. 1E and FIG. 15). The range of options is too large to be described further. All the options are basically described by expressions (4) and (5).

When a pre-load spring is used, as indicated diagrammatically in FIG. 1A, it is necessary to distribute the centrifugal masses on the aerodynamic portion of the blade to be certain that the "natural" mass distribution of the blade will not have such a strong "blade flattening" action of its own that it will not nose down when the preload torque is exceeded. The upper diagram of FIG. 1A shows how to be certain of this. Anti-flattening masses q may be made as powerful as necessary, neutralizing or even producing anti-flattening in the centrifugal mass distribution of all the blade on the aerodynamic side of the preloaded spring. Also see FIG. 15 in which a balanced pair consisting of two anti-flattening masses q, lying on the aerodynamic portion of the blade outboard of the preloaded spring perform this function.

In all of the conditions described above, the blade will still weathervane, but will do so balancing the aerodynamic hinge moments against the centrifugal hinge moments.

If a gust occurs which would otherwise change the lift force, the weathervaning blade changes angle of attack to maintain constant the aerodynamic moments due to its lift and its camber, to balance the centrifugal moments which stay essentially constant. Whirling speed is maintained by momentum, and there is no change in $mr^2$. Only $\psi$ changes, but only through a small angle compared to its 45 degree range from zero effect to peak effect.

As described, above, when the pre-load spring has not acted, $\Delta\alpha = \Delta\psi$. The rotation of the blade in angle of attack changes $\psi$ by the same amount that $\alpha$ is changed. For example, if the gust is due to an increase in the natural wind velocity, the weathervaning change of the blade angle rotates the zero lift line of the airfoil further from the plane of the whirling disk, decreasing blade angle $\beta$ (FIG. 1B), reducing the flattening of the blade, and the angle $\psi$ decreases by the same amount that the blade angle $\alpha$ decreases. In the operating range of the blade, $\psi$ is greater than 45 degrees and less than 90 degrees, so that this change of $\psi$, of itself, (at constant whirling speed) moves $\psi$ toward 45 degrees, and increases the nose up centrifugal hinge moment, producing a statically stable restoring moment, acting to restore $\alpha$ toward its original value. By design, within limits, this restoring moment may be made large or small. The lift change which would have occurred on the blade if it had not weathervaned is not totally eliminated. Some lift increase, in this case, occurs on the blade, but it is a small part of the change which would occur without weathervaning, and it is a *necessary* residual effect. By means of this small increase in lift the blade is moved in a statically stable manner toward a new position of equilibrium, and the effect of the gust has been avoided except for this necessary stabilizing restorative action.

The action described above for an increase in the velocity of the natural wind, occurs in the same manner for a slackening of the natural wind except that the directions are reversed. Both respond as a system in static equilibrium.

The dynamic response of this system is also a matter of design. The center of gravity of the blade lies on the free weathervaning axis. The moment of inertia of the blade around the free weathervaning axis should be no greater than necessary, the long aerodynamic blade should be kept as light as possible, and the free pivot weathervaning axis should be well forward on the aerodynamic blade. These features combine to produce a quick response by the blade when it changes its pitch angle due to a change in wind angle of attack. The dynamic situation is made insensitive by the fact that natural gusts are not mathematically abrupt on the quick time scale corresponding to the small time intervals required for blade pitching response. Also some time is required for any lift change to develop aerodynamically on the blade. The fully developed aerodynamic action on the blade is the net integrated result of the changes on all the blade sections from root to tip, with local changes of lift at one station along the blade generating three dimensional flows which after a brief but finite time interval affect all the other sections on the blade. Such actions soften the abruptness of the gust effect on the blade. They provide the brief but important time interval which enables the blade to weathervane correctively as the application of the gust load tries to develop. Initial studies indicate that these sections will enable the weathervaning to follow the worst gusts smoothly, in a dynamic sense.

The blade of the present invention, being centrifugally controlled in angle of attack, is governed by an essentially constant centrifugal pitching moment, Gusts affect only the aerodynamic pitching moments on the blade, causing the blade to decrease lift correctively when it attempts to increase lift, and vice versa. The flywheel effect of the blade holds RPM steady, holding the centrifugal moments steady, and the automatic free pitching of the blade in response to gusts holds the aerodynamic torque steady, responding to the longitudinal effect of the wind speed over an interval of time instead of responding to the instantaneous wind speeds.

With the centrifugal mass configuration held constant, if torque is decreased on the mill shaft, RPM increases, the centrifugal pitching moment increases, and the blade angle of attack increases (the blade becomes "flatter"). If torque is increased, the reverse occurs; the blade goes to a blade angle which is not as "flat." The response is that of the desired automatic change of blade angle: At small torque and high RPM, the blade is in "flat pitch," flat to the whirling disk; at conditions of heavy torque and low RPM, the blade automatically takes the coarse pitch required to avoid stalling angles and to develop strong torque.

By means of equations (3) and (4), computer programmed, all of these actions may be analyzed for design purposes, to determine machine response and performance under any operating conditions.

Experimental operation of test machines to date confirm that operation in gusty wind is remarkably smooth and efficient, and that the machine responds as expected.

PREFERRED EMBODIMENTS

Referring now specifically to the drawing: FIGS. 1A through 1E, discussed above, illustrate the principles of aero-centrifugal blade angle control on horizontal axis wind turbines. FIG. 2 shows the general arrangement of the freely weathervaning and balanced aerodynamic blade of this invention. Power driven aerodynamic roller 1 is mounted on its spinning axis in the leading portion of airfoil 2, which provides mechanical support for both ends of roller 1. Airfoil 2 pivots freely in pivoted mounting base 3A by means of blade shank 3B which is attached structurally to airfoil 2. Base 3A is the object to be kept in movement by the power of the wind. It may be a ship or a carriage to be propelled, or a hub or shaft to be rotated.

Base 3A and blade shank 3B in combination form the power-generating joint which transmits stresses and produces the power-generating movement of the wind machine, whether that wind machine is a wind ship or a wind turbine.

In the wind ship, the generally horizontal resultant of the wind forces on the blade acts structurally through this joint as a horizontal force, acting from airfoil 2 to blade shank 3B to ship structure 3A, producing movement of the ship, delivering the useful power which propels the ship.

In the wind turbine, the component of the resultant wind force on the blade which lies in the whirling plane of the blade perpendicular to the long axis of the blade produces a driving torque around the generally horizontal axis of the power shaft 3A, acting from airfoil 2 to blade shank 3B to power shaft 3A. This driving torque rotates the power shaft, delivering the useful power which performs the work accomplished by the shaft. This shaft performs the same mechanical function as the power shaft on any other type of engine or prime mover.

Trim tab 2A, operating like an aircraft control surface trim tab, adjustable in angular position around a pivot axis lengthwise of the tab in the leading edge of the tab, is controllable through moderate angles of displacement relative to the trailing edge of airfoil 2 by conventional positive mechanical means not shown. When tab 2A is angularly displaced out of the plane of airfoil 2, at a particular angle, it exerts corresponding aerodynamic hinge moment on airfoil 2, adjusting or controlling the angular position of freely weathervaning airfoil 2, in the manner of a rudder.

FIGS. 3A and 3B illustrate the flow around spinning roller 1 acting without airfoil 2 being present and indicate how this flow would be improved by the presence of airfoil 2. The thin dash lines in these figures represent streamlines which occur due to roller action alone, when airfoil 2 is not present.

In FIG. 3A, the peripheral speed $U_A$ of roller 1 is relatively large and the speed $V_A$ of the approaching wind is relatively small, so that the value of $(U/V)_A$ is relatively large. The streamlines past roller 1 are strongly arched due to aerodynamic circulation generated by roller 1 and the resulting lift coefficient of roller 1 is large.

In FIG. 3B, the peripheral roller speed, $U_B$, is small and the approaching wind velocity, $V_B$, is large, so that $(U/V)_B$ is small. Now only a small amount of flow arching is produced, and the lift coefficient of the roller is small.

At constant roller speed, an automatic change of lift coefficient occurs in response to a change of wind speed. When the wind speed is low, so that high lift coefficients are desirable, the value of $U/V$ is large (FIG. 3A) and the lift coefficients are large, as desired. When the wind speed is great, and small lift coefficients are sufficient, the value of $U/V$ is small (FIG. 3B) and the lift coefficients are small.

The swirling lines downstream from roller 1 in FIGS. 3A and 3B represent separated flow, a source of strong aerodynamic drag. The heavy dash lines downstream from the roller represent the positions in which airfoil 2, *if present*, would eliminate the separated flow, would greatly reduce that aerodynamic drag, and consequently would greatly improve the aerodynamic performance of the roller section.

Wind tunnel tests have confirmed great aerodynamic benefit due to the presence of airfoil 2, and due to high values of $U/V$, as may be inferred from FIGS. 3A and 3B.

FIG. 3C, taken at section 3—3 of FIG. 2, illustrates the immunity of the aerodynamic properties of the roller/airfoil blade section to change of angle of attack (except for brief transient adjustments). Regardless of the aerodynamic configuration of the cross sectional profile of airfoil 2, regardless of whether tab 2A is present, and regardless of the free trailing position of airfoil 2, the *strengths* of the lift force and the drag force on the roller/airfoil combination will not change when the angle of attack changes. This behavior is totally unlike that of a rigidly mounted conventional airfoil section, the lift and drag of which are directly determined by its angle of attack.

In FIG. 3C, when the ambient wind direction rotates counterclockwise from $V_1$ to $V_2$, increasing the angle of attack by the amount $\Delta\alpha$, airfoil 2 weathervanes counterclockwise by the same amount $\Delta\alpha$, and lift L and drag D both rotate counterclockwise by the same amount $\Delta\alpha$. The situation at the end is the same as at the start, except that the whole pattern of geometry—roller, airfoil, streamlines, and the directions of action of all the pressures and forces—has taken up a new alignment rotated by the angular amount $\Delta\alpha$, the same as the change of angle of wind direction. Typically, $\Delta\alpha$ is small and $\cos \Delta\alpha = 1.00$, and $\sin \Delta\alpha = 0$, approximately, so that the changed *direction* of lift and drag are of little consequence. It follows that there is no sensitivity to wind gusts, so long as airfoil 2 is weathervaning.

Airfoil tip 4, located beyond the outboard end of aerodynamic roller 1, as seen in FIG. 2 and FIG. 4 (taken at section 4—4 of FIG. 2) and tip plate 5, as seen in FIG. 2 and FIG. 5 (taken at section 5—5 of FIG. 2) are attached to airfoil 2 so that no relative motion occurs between airfoil 2 and either tip 4 or plate 5. The portion of airfoil tip 4 forward of axis p is aerodynamic nose balance 4A.

The flow pattern shown in FIG. 3A would cause induced drag sufficiently strong to make the blade aerodynamically unacceptable if neither airfoil tip 4 nor tip plate 5 were present. Their positions outboard of the outer tip of roller 1 sharply reduce this induced drag, making the blade aerodynamically efficient. Flettner lacked these features. All of his roller applications suffered greatly from excessive and unnecessary induced drag.

In the prior art, spinning flat circular disks were attached to the ends of spinning aerodynamic rollers, spinning with the rollers, to reduce induced drag. But these older spinning end disks produced aerodynamic circulation, so that they did not serve purely as aerodynamic barriers but also generated useless circulation which of itself produced induced drag. Furthermore, more power was required to spin those disks than to spin the rollers, whereas no spinning power whatever is required by the present tip plate 5. Therefore, the older end plates were relatively ineffective, and were not efficient for power recovery. The present end plate 5 can be made much larger, encountering only the relatively small drag due to skin friction, and can be of any planform found by testing to be the most effective. Consequently, end plate 5 can succeed where the previous spinning end disks produced an aerodynamic form which would not succeed.

Airfoil tip 4 and plate 5 each embody a substantial amount of aerodynamic surface area, and each terminates downstream in a thin vane-like form capable of efficient guidance of aerodynamic flow. These features enable them to perform aerodynamic functions as taught here, in contrast to incidental structure lacking these features which might be located similarly in the prior art.

Mass balances 6A and 6B are rigidly attached to airfoil 2 forward of axis p of the free mounting pivot of the blade, shown in FIG. 2. The spinning axis of roller 1 coincides with axis p in FIG. 2, but this need not always be the case. See FIG. 1 where the same principle is applied to an airfoil without a roller.

Balances 6A and 6B, acting together, balance the total weight moments of the aerodynamic blade around pivot axis p. Most of the weight of airfoil 2, airfoil tip 4, and tip plate 5 lies rearward of pivot axis p, so that balance weights 6A and 6B are located forward of that axis. When balanced in this manner, the action of FIG. 3C occurs not only when the aerodynamic blade is standing vertically, but when it is in any position whatever. For example, if a ship employs the blade, and the ship is listing, airfoil 2 will have no tendency to swing down at its trailing edge.

Mass balance 6A has the additional function of *dynamically* balancing airfoil 2 and all the weight rigidly attached to airfoil 2 around a design axis of rotation. On a horizontal axis wind turbine this axis of rotation is the horizontal mill shaft. On a ship, the axis is the effective rolling axis of the ship. When the aerodynamic blade accelerates in angular velocity around such an axis, the mass at a greater distance from the axis of rotation experiences a greater linear acceleration than mass close to the axis. These effects may be calculated by well known methods. A constant amount of total mass moment in 6A and 6B can accomplish *static* balancing, as described above. Then, the proper distribution of this mass between 6A and 6B, as determined by calculation, can accomplish *dynamic* balancing, preventing blade swinging due to angular *accelerations*. A ship using blades so balanced can list under the pressure of the wind on the blades, and can roll sharply from side to side and there will be no significant tendency for airfoil 2 to swing on its pivot due to mass effects.

Motor 7, shown in FIG. 2, spins roller 1 at various RPM to accomplish changes in U/V, (See FIGS. 3A and 3B). For use on sailing ship 8 (FIG. 7), the direction of spinning is reversible, and therefore the cross section of airfoil 2 is symmetrical, and high values of U/V are achieved by means of rollers having relatively large diameters.

FIG. 6, taken at section 6—6 of FIG. 7, shows a typical aerodynamic blade cross section for sailing ship 8. Trim tab 2A is shown in its neutral position (solid lines) and in a displaced position (dotted lines), in a position to displace airfoil 2 clockwise.

Shield 9, having the cross sectional form of a circular arc, is attached to airfoil 2 on circular arc tracks and rollers, not shown. In its operating position shield 9 always covers the rearward portion of the forward-moving side of roller 1. When the direction of spin of roller 1 is reversed, as when changing heading while tacking, shield 9 in carried on its track by roller spin, by rubbing means not shown, to the opposite side of the roller, in order to cover what has now become the rearward portion of the forward-moving side of the roller. Shield 9 also serves as an aerodynamic seal between roller 1 and airfoil 2.

Wind tunnel tests have shown major improvements in aerodynamic performance due to the presence of shield 9, and due to aerodynamic seals. The greatest benefits occur when shield and seal operate together.

A slight rubbing friction between roller 1 and trailer 2 displaces airfoil 2 clockwise in FIG. 6. In either direction of roller spin, this displacement causes airfoil 2 to increase the lift of roller 1.

FIG. 7 shows sailing ship 8 equipped with the aerodynamic blade of this invention. In this use, during non-threatening weather conditions, airfoil 2 is locked rigidly to the ship. This is an exception to the usual weathervaning action of airfoil 2, because weathervaning is not needed in the steady winds of fair weather at sea. Control of airfoil 2 for achieving maximum aerodynamic performance is described below.

In FIG. 7A, an enlarged sectional view is taken in the median plane of the ship in FIG. 7 at the mounting of airfoil 2 and airfoil shank structure 3B into the mounting structure 3A at the ship's deck. Wheel 10 is pivoted on the end of arm 11, which is attached rigidly through shank 3B to airfoil 2. Wheel 10 is made sufficiently heavy to serve the balancing function of mass balance 6B, previously described. Motor 12 turns wheel 10 in either direction, with brake 13 released, with wheel 10 rolling on horizontal reinforced circular track 14, carrying airfoil 2 to any position, according to command signals from the captain of the ship by well known means not shown. To hold airfoil 2 in a fixed angular position, brake 13 is applied, preventing rotation of wheel 10. Skidding between wheel 10 and track 14 is prevented in all normal conditions by high pressure inflation of a tire on wheel 10. Additional arms 11 and wheels 10, not shown, may be used to balance the reaction force of tire pressure on track 14 around the free pivot axis of airfoil shank 3B, and to take moment loads off of radial bearings 15, and weight loads off of thrust bearing 16.

In operating ship 8 in FIGS. 7 and 7A, roller 1 is spun by motor 7 in one direction or the other at the RPM required by the operating conditions, in response to command signals from the captain. The weight of roller 1 is carried by angle contact bearing 17, or by equivalent thrust and radial bearings.

The joint which produces the power-generating movement of the wind ship is the joint shown in FIG. 7A, consisting of blade shank 3B which is structurally integral with airfoil 2, bearings 15 and 16, and base 3A which is structurally integral with the hull of the ship. Also see FIG. 2.

Airfoil 2 is held locked in the most efficient angling position, and the roller is spun at high RPM to produce the most economical ship operation. On a large structure of this sort, high values of U/V may be achieved which produce lift coefficients as high as 4.0, based on the total planform area of roller and airfoil surfaces, producing results roughly equivalent to having conventional said area four times as large as the actual physical area of the blades, and having such less aerodynamic drag then conventional sails, so that a new plateau of sailing effeciency is reasonably expectable.

In severe weather, if the angle of airfoil 2 is held locked, severe loads could develop. But several actions work against this possibility. See FIG. 7. Wheel 10 may skid on track 14. U/V will decrease, reducing the effective equivalent sail area, because the natural wind speed V will increase and U will remain constant, or may be reduced.

Unlike full rigged ships, the "sails" on this ship can be "furled" instantly, without any need of a crew, by stopping the power to motor 7, and releasing brake 13, allowing the blades to weathervane freely. In this condition, the blades develop no lift, and have less wind drag than the masts, spars, and rigging of a conventional sailing ship.

Even in storm conditions the rollers may be used, with the airfoils weathervaning. The spinning rollers decrease the wind drag on the blade. Trim tabs 2 are then controlled to place airfoils 2 at an angling position in the wind, thereby in conjunction with the spinning speed of the rollers, controlling the amount of the lift force on each weathervaning blade. A steady and controllable force will result, even though the blades may be pivoting continuously in an erratic violent wind. This action plus rudder action controls and propels the ship. Since both the rollers and the airfoils are then immune to the effects of angle changes due to gusts, the primary source of dangerous loadings has been removed. By this action, the ship may be maneuvered, and make headway tacking against storm winds.

Ship 8 can sail closer to the wind while tacking, and sail relatively faster, than the Flettner Rotor Ship of the 1920s, with less power expended in reversible electric motors 7. These improvements are due to the reductions of wake drug by the presence of airfoil 2, the reductions of induced drag by means of airfoil 4 and plate 5, and the reduction of power to spin the rollers by the elimination of Flettner's spinning end disks. This ship retains Flettner's advantages of mechanized control, minimum crew, elimination of major crew risks, and high maneuverability. It has "push button" sail furling, stopping roller 1 and allowing airfoil 2 to weathervane. Its low superstructure wind resistance for safety in storms is even less than Flettner's because the free trailing airfoils 2 always reduce the wind drag of rollers 1.

As described above, applied to a wind ship, the aerodynamic blade of this invention must operate with the roller spinning either may and with lifting pressure applied to either side of the blade, leading to a blade section (FIG. 6) which is symmetrical except for movable gap cover plate 9.

When the same blade is applied to a horizontal axis wind turbine, there is no longer a requirement for blade section symmetry. The blade may be designed to whirl in one direction only, with the roller spinning in one direction only. This offers major opportunities for increasing the aerodynamic performance of the roller/airfoil blade section.

FIG. 8 shows a general type of high efficiency roller/airfoil blade section for single-direction roller spinning. It embodies a stationary gap cover functioning like plate 9, airfoil camber, cusped trailing edge, and maximum exposure to the flow on the most useful surface arcs of the roller, for aerodynamic benefits at high U/V and for deliberate aerodynamic drag production at low U/V. It may also employ a trim tab, like 2A.

The generalized form of the cross section is shown in FIG. 8. The direction of roller spin is shown by the curved arrow. The various regions are identified as follows:

By Points on the Roller Contour a—Lower section, forwardly moving
b—Forward section, upwardly moving
c—Upper section, rearwardly moving
j,a—Downwardly, forwardly moving
d—Point of abrupt change of direction, upper surface contour line
f—Gap cover leading edge

By Other Points e—Trailing edge, thin cusp
g—Downwardly convex airfoil contour line, lower, forward
h—Downwardly concave airfoil contour line, lower, rearward

By Distances, Lines, and Surfaces i—Rearward offset
b,c,d,e—Upper surface contour line
c,d,a—Downwardly circling rear surface
b,f,g,h,e—Lower surface contour line
f,g,h,e—Smoothly faired lower surface contour line of the airfoil portion of the profile Using these identifications as shown on FIG. 8 the preferred blade cross section profile for the roller portion of the blade of a horizontal axis wind turbine has these features:

The roller is exposed in the upwardly moving most forward region of the roller and in the rearwardly moving upper region of the roller, and is covered in the downwardly forwardly moving region and in the forwardly moving lower region of the roller.

The lower surface of the airfoil is a smoothly faired durve, downwardly convex in its forward region and downwardly concave in its rearward region, and the trailing edge of the profile is a thin cusp.

In designs for superior aerodynamic performance at high U/V, when poor aerodynamic performances at low U/V is acceptable or is preferred for machine control by controlling roller RPM, the upper contour line of the profile follows the circular arc upper contour of the roller rearward to the downwardly curving rear surface of the roller, abruptly leaving the rear surface, the contour line forming an angle locally at the rear surface and moving rearward from there to the trailing edge.

Roller/airfoil sections as in FIG. 8, as just described, have been found in preliminary tests at high U/V to have unusually high values of $C_l/C_d$ and $C_l/C_d$, combined with $C_l$ values distinctly higher than available from any non-roller airfoil sections. If efficient operations are required at lower U/V, point d on FIG. 8 tends to move toward point c, so that offset i becomes smaller; point e moves rearward, broadening the overall chord, and the upper and lower contours become relatively flatter. An example of a roller/airfoil section for a somewhat smaller U/V is shown in FIG. 11.

FIG. 9 shows the invention as one-bladed horizontal axis wind turbine 18. A single aerodynamic blade, as previously described, is counterbalanced by balancing stub 19 around horizontal mill shaft 20 and teetering pivot 21, and the entire upper portion of the machine to which the blade is attached is mounted on stationary mast 22, pivoted conventionally in yaw on pivot 23, and pivoted unconventionally in pitch on pivot 24. Central body 25, which houses mill shaft 20, is aerodynamically stabilized conventionally by vertical tail surface 26, and unconventionally in pitch by tail surfaces 27 which function in part as horizontal tail surfaces, as shown in FIG. 10, taken at section 10—10 of FIG. 9. Tail balance weight 28 balances the entire upper portion of the machine around pitching pivot 24. Power train 29, consisting of sheaves and belts, rotates the shaft of alternator 30, producing electrical energy which is stored in batteries, not shown, at the foot of mast 22. The weight of alternator 30 and its supports and drives brings the center of gravity of the entire upper portion of the machine to a position just below pivot 24, so that the upper unit hangs on pivot 24 in a lightly stabilized horizontal position.

In FIG. 9, the wind produces forces on the aerodynamic blade, including roller 1 and airfoil surface area 2, producing resultant force components on the blade in a direction perpendicular to the plane of the paper, producing a torque around horizontal mill shaft 20. When the aerodynamic blade starts to rotate, power starts to flow from the moving wind into the whirling rotation of the aerodynamic blade and the rotation of mill shaft 20 around its central axis, through the moving parts of power train 29, into the rotating shaft of alternator 30, where the mechanical power is converted into electrical power.

The aerodynamic blade, embodying roller 1, airfoil 2, airfoil tip 4, and mass balances 6A and 6B, is shown in its free trailing no-lift position, $\beta = 0$ degrees, which it takes when the wind is blowing and roller 1 is not spinning. When spinning, roller 1 turns in the direction shown by the curved arrow.

In the windmill of FIG. 9, the use of aerodynamic end-plate 5, as shown in FIGS. 2, 5, and 7 is optional. It is not shown in FIG. 9, but would be used in high torque designs in which relatively large rollers, broad airfoils, and slow whirling speeds are used. See FIG. 19, II.

Blade balancing stub 19 is attached to the root end of the aerodynamic blade, in line with the free weathervaning axis p of the blade, the aerodynamic blade being on one side of teetering pivot 21 and stub 19 being on the opposite side of pivot 21.

In alternative designs, machines employing 2, 3, or more blades may be constructed, based on the same principles described here. For example, in a two-bladed design, all of the functioning parts of the blade corresponding to those described in FIGS. 12, 13, and 15 below, except for balancing mass serving only as stub mass to balance the blade around mill shaft 20 would be moved to the same side of mill shaft 20 as airfoil 2. Stub 19 would be eliminated, and a mirror-image blade symmetrically identical to the single blade (modified as just described) would be attached in place of stub 19. Each of these blades would teeter independently on its own teetering pivot on the hub structure corresponding to pivot 21, and would weathervane freely in pitch on lengthwise weathervaning pivot, p. A thrust bearing in each inboard blade shank or a long slender torsionally flexible tension tie rod lying on pivot p would transmit the centrifugal forces from each blade due to whirling into the hub where each would be balanced against one or more symmetrically positioned blades. Three, four, or more blades could be mounted symmetrically on a central hub in this manner.

Centrifugal blade angle control described above and in expression (4) and in FIGS. 1A, 1C, 1D, and 1E operates the same regardless of whether it is in the position m.a.$_1$ or the position m.a.$_n$, as shown on FIG. 1A. Similarly, the gyroscopic moments described in expression (1) are the same on either side of the mill shaft, regardless of whether the spinning gyroscopic mass is located in the blade or in a blade stub.

Advantages of the one-blade machine include relatively greater economy, fewer parts to manufacture and service, more effective use of mass for multiple functions, easier blade system balancing, and reduction or elimination of heavily loaded thrust bearings or their equivalents carrying centrifugal blade loads.

A single bladed machine reaches more wind per dollar than any other type. A single bladed machine has an effective disk area just as great as a two-bladed or three-bladed machine using the same blade radius, but the cost of one blade plus stub is less than the cost of two or three blades.

The starting point for saving weight in the one-bladed roller mill is to make the roller as light as possible. Modern fiber technology structure is well suited for this purpose. Then the gyromoments due to roller spinning and whirling are small, and the airfoil structure to carry these moments, also using fiber technology, is light. The centrifugal stresses then become correspondingly light, and the additional structure to carry them is light and the mass balances are light.

The single blade construction enables these mass balances to serve dual functions: the balancing masses which produce centrifugal blade pitching moments, motor 7 which drives the roller, and any counter-spinning masses which may be used to cancel or reverse the gyromoments caused by the spinning roller, may all be located in the one-blade mill on the stub side, where they contribute to the balancing of the single blade around mill shaft 20.

The entire one-bladed wind machine, including mast 22 and guying cables, can be disassembled into pieces generally of long slender form, which can be packed compactly in crates, and transported economically by truck, rail, or ship. Assembly is accomplished mainly by sliding parts together and joining with bolts. This would not be as convenient and practical with a construction having two, three, or more blades, which itself would require either a bulky crate or sensitive balancing upon assembly.

The aerodynamic efficiency of the single blade is well established, particularly for use at high tip speed ratios, but this construction has not been extensively used heretofore for several reasons:

Because of its small total blade area, the one-blade design using a conventional airfoil blade does not operate well at the lower tip speed ratios. It does not produce enough torque for some applications. On the present invention, the ability of the roller to generate unusually high lift coefficients compensates for this. The roller extends the usefulness of the one-blade mill across the entire spectrum of tip speed ratios. Specially proportioned one-blade mills, designed for high torque and low RPM can perform the functions of conventional farm/ranch windmills which typically use 18 blades. (FIG. 19, II.)

The one-blade machine in FIG. 9 makes the maximum use of free pivots to reduce stresses, weight, and cost. So far as possible, the aerodynamic parts are allowed to function as if in free flight, unrestrained, aerodynamically stabilized, and consequently able to respond with a minimum of internal stresses. The entire upper aerodynamic unit "flies like an arrow," except that its weight is supported near its center of gravity by mast 8.

The details shown in FIG. 9 illustrates these principles. Mast 22 supports the weight of the machine. The weathervaning aerodynamic body consisting of central body 25 and tail fins 26 and 27, is pivoted to mast 22 at horizontal pivot belt 24, so that the weathervaning parts of the windmill are not only free to swing around conventionally in a horizontal plane, but are also free to pitch nose up and nose down. Mechanical stops, not shown, are provided to limit this body pitching motion to moderate angles.

Teetering pivot 21 enables the aerodynamic blade to adapt to changes of wind velocity and to gyroscopic moments, by temporarily moving upstream or downstream at its free tip. In the usual vertical wind velocity gradient caused by the surface of the earth stronger winds act at the top of the swing of the blade, and weaker winds act at the bottom of the swing. The teetering blade responds to this by teetering upwind at the bottom of its swing, and teetering downwind at the top of its swing. This motion cooperates with the blade-weathervaning action to eliminate aerodynamic inefficiencies, bending stresses on the blade, and the cyclical noise otherwise occurring due to cyclical changes of angle of attack on the blade. Similarly, if a sudden side gust or change of wind direction occurs, causing the upper body of the machine to yaw abruptly to a new heading, the whirling blade is subject to gyroscopic moments, nose-up or nose-down. Instead of producing bending stresses in the blade and in mill shaft 20, body 25, and mast 22, the blade teeters temporarily on pivot 21. Similar actions, with stress relief, occur whenever airfoil tip 4 is driven forward or rearward, whatever the cause may be.

Similar stress-relief actions occur by means of the combined actions of pivots 23 and 24. If centrifugal mass unbalance occurs in the whirling plane of the blade, whatever the cause, the front end of mill shaft 20 will move in a circle lying generally in the whirling plane. If either pivot 23 or 24 were not present, corresponding bending stresses and springy deflections would be produced in mill shaft 20, body 25, and mast 22. These stresses and distortions, and torsional stresses and deflections in mast 22, are eliminated by pivots 23 and 24. The upper body will oscillate in heading and pitch, but will be held to a median position by the aerodynamic stabilizing and damping actions of tail surfaces 26 and 27. Since severe bending stresses and deflections can be avoided in all the members by these means, and since the blade can adjust to the oscillating motions by weathervaining in pitch and teetering, these oscillating motions occur without adverse consequences.

By contrast, on conventional windmills, in any of these temporarily unbalanced conditions, bending moments are produced which are resisted by structure which yields elastically. Stresses originate in the whirling blades and pass into the structure, exciting aeroelastic vibrations which can cause cracked and broken parts—blades, shafts, and bolts—and which always require heavier and more expensive structure than otherwise needed. Typically, large wind turbines for electric power generation do not employ stabilizing fins for weathervaning the mill shaft to align with the wind, but use mechanically positive "irreversible" drive systems to perform this function. Yet gyromoments and other inertial reactions still occur, so that vibrations are still troublesome on the long slender blades and in the yawing mechanisms and power trains used on such wind turbines.

The roller/airfoil of this invention is less sensitive to flutter and forced vibrations than is a conventional rigidly attached airfoil type blade. The spinning roller has a steadying effect. The airfoil behind the roller is relatively deep and stiff and the aerodynamic forces are steady, even in gusty conditions. On the other hand, the conventional rigidly anchored airfoil structure, as used in large wind turbines, has well-known aeroelastic limitations. Its structural deflections in torsion and bending interact with large simultaneous changes of aerodynamic lift forces and pitching moments due to changes of airfoil angle of attack. The blade of this invention reduces this aeroelastic risk by its insensitivity to the sources of excitation, and by its roller/airfoil structure which, for blades of any particular blade aspect ratio, substantially increases the bending and torsional stiffnesses, as compared to a purely airfoil type blade. For example, a conventional airfoil-type blade seldom employs a blade section having an airfoil thickness greater than about 15% of the blade chord. A typical roller/airfoil blade has an airfoil depth about 26% of the overall chord. This beam depth is 1.73 times greater and the bending stiffness is about 5 times greater on the roller/airfoil, compared to a purely airfoil type blade having the same planform.

When the construction illustrated in FIGS. 9 and 10 is designed with low bearing stresses at all the pivots described—blade weathervaning in pitch, blade teetering, body pitching, and body yawing, and when the structure between these pivots is made stiff, keeping elastic deflections and stresses small, maintenance-free operations over many years should be possible without flutter and without structural cracks and fractures, despite severe weather and some temporary operation out of balance.

The blade of the horizontal axis wind turbine of FIG. 9 is able to weathervane around its lengthwise pitching axis between the position edgewise to the natural wind ($\beta = 0$ degrees) as shown in FIG. 9 and a position pitched approximately 90 degrees from the position shown ($\beta$−90 degrees), in which position airfoil 2 would lie behind roller 1, and mass balances 6A and 6B would be positioned toward the reader, with the chord plane of airfoil 2 lying substantially in the blade whirling plane. That plane, seen edgewise by the reader, passes through pivot 21, perpendicular to mill shaft 20.

FIG. 11, taken at section 11—11 of FIG. 9 shows a roller/blade cross section of the wind machine of FIG. 9, designed for a value of U/V somewhat lower than the generalized section illustrated in FIG. 8.

In the power-off parking position of FIG. 9, the concave trailing region of the blade section of FIG. 11 is on the far side of the blade from the reader. When roller 1 is started spinning in the natural wind, with the direction of rotation shown by the curved arrows in FIGS. 9 and 11, the roller produces negative pressure on its side toward the reader, and the combination of roller action and blade movement toward the reader causes blade 2 to trail behind the movement, increasingly moving more broadside to the natural wind, gaining whirl speed, until the centrifugal pitching moments "take hold" at a blade angle of around 45 degrees, and the blade enters its working range of high performance power recovery, with the blade relatively "flat" to the whirling plane.

There are no mechanical blade angle restraints which limit the freedom of blade angle changes, across the aerodynamically required range of blade angles, from the flattest blade pitch angle needed for maximum power recovery to the steepest blade pitch angle needed for start-up blade rotation in light breezes. A restraint anywhere in this normal range of blade angles would interfere with free weathervaning and could destroy the free-running, low stress quality of the machine. (A pre-load spring to limit runaway RPM, which does not introduce any mechanical stops, is useful in some designs. See FIGS. 1A, 15, 16, and 17.)

In some machine designs, a blade angle stop may be used to assist the centrifugal pitching masses of the blade in flattening the blade angle, in the start-up mode just described. Such a stop at angle $\psi$=45 degrees (see FIGS. 1A, 1C, and 1E) enables the centrifugal pitch control system to get the maximum benefit from $\psi$ when $\omega$ is small. See expression (4). (Sin $\psi$ cos $\psi$ is maximum at 45 degrees.)

Airfoil tip 4 in FIG. 7, used on ship 8, is a symmetrical section as shown in FIG. 4, because roller 1 on ship 8 spins either way. On the horizontal axis wind turbine of FIG. 9, the airfoil section of tip 4 is cambered with the concave side of its mean camber line lying on the side away from the reader, just as the concave side of the roller/airfoil section of FIG. 11 lies on the side away from the reader. Tip 4 may be of an aerodynamically twisted form, "washed out" somewhat toward the free tip to develop a forward thrust on the tip, reacting to the strong upwash from roller 1, and it may be slotted to prevent stalling.

It may be observed that the lengthwise pitching axis of the blade (consisting of roller 1, airfoil 2, and airfoil tip 4) in FIG. 9, this axis being on line p—p, lies forward of the quarter chord line of the blade. This may be seen in the section of FIG. 11, where axis p coincides with the spinning axis of roller 1. Any combination of roller 1 and airfoil 2, with axis p at the center of the roller, would require a total section chord less than twice the roller diameter if the roller spinning axis were to lie rearward of the quarter chord point. This would be a very narrow airfoil 2, not likely to be used. Even then, airfoil 2 is independent of roller 1 for weathervaning, being freely pivoted on axis p with practically all of its surface area rearward of this axis. Therefore, in all conditions in which a spinning roller 1 delivers streamlined aerodynamic flow to airfoil 2, that airfoil 2, freely pivoted on the roller axis, will weathervane in a stable manner. All other sections on the blade, having conventional airfoils will affect weathervaning as described in the section "The Free Weathervaning Pivot and the Aerodynamic Center of the Blade," and FIGS. 1A and 1B.

As a practical rule-of-thumb a blade according to this invention will weathervane in a stable manner when the airfoil portions of the roller/airfoil sections are freely pivoted on the roller axis, and when the conventional airfoil sections are freely pivotable forward of their quarter chord point.

Accordingly, the blades shown in FIGS. 2, 9, 12, 15, and 19 will all perform stable weathervaning.

In actual design, to achieve the desired precision of interaction between the centrifugal and aerodynamic actions, analysis and testing should be performed.

FIG. 12 is an enlarged view of the hub region of the one-bladed wind machine of FIG. 9. Mounting base 3A and blade shank 3B correspond to parts on FIG. 2 having the same basic functions.

FIG. 13, taken at section 13—13 of FIG. 12, shows internal parts in the hub region.

Blade hub 31 is a hollow circular sectioned tube, pivoted to mill shaft 20 at teetering pivot 21, housing internal angle contact bearings 32 into which blade hub shank tube 33 fits. Bearings 32 perform both the radial and thrust functions of bearings 15 and 16, respectively, of FIG. 7. The thrust restraint of bearings 32 prevents lengthwise relative movement, but allow low friction freedom to rotate around the lengthwise axis p of the blade, which is the common central axis of hub tube 31 and shank tube 33.

In FIG. 9 pivot 21 stands between the wind-forced whirling motion of the aerodynamic blade and the generator-resisted spinning motion of mill shaft 20; it is one part of the power train which transmits mechanical power from airfoil 2 to alterantor 30. In FIGS. 12 and 13 some of the details of this power train are shown. If any part in this succession of moving power-transmitting parts were absent, the power-generating movement would be interrupted and no useful power could be delivered: Airfoil 2 is attached rigidly by structural plates 35 to hub shank 33, which passes through blade hub tube 31. Bearings 32, located inside circular-sectioned hub tube 31, permit rotation of airfoil 2 around blade pitching axis p, but do not permit axial movement of hub shank 33 relative to hub tube 31. Hub tube 31 is attached to rigid power shaft assembly (mill shaft) 20, by means of pivot 21.

Mounting base 3A consists of mill shaft 20, pivot 21, blade hub type 31, and bearings 32. Blade shank 3B is blade hub shank tube 33. Base 3A and blade shank 3B acting together, form the power-generating joint which produces the power-generating movement of the wind machine, just as shown in FIG. 2.

Wind sensing electrical switch 36 is mounted rigidly, facing the wind, on the front of blade hub tube 31, at the mill axis of rotation.

On the airfoil side of the blade hub, airfoil 2 is rigidly attached to the outboard end of shank tube 33, by means of structural plates 35. Opposite to this, on the side of the hub toward stub 19, motor box 34 is rigidly attached to the other end of shank tube 33. Electric motor 7 is rigidly attached in motor box 34 and drives motor shaft 37, so that motor 7 and shaft 37 are held on the common axis of tubes 31 and 33. Shaft 37 passes through the full length of tube 33, and attaches rigidly to roller 1. Shaft collar 38, rigidly attached to motor shaft 37, bears on angle contact bearing 17, supporting the inboard end of roller 1. Shaft collar 38 and bearing 17 carry the radially outward centrifugal reaction from the roller accompanying whirling rotation of mill shaft 20.

Mass balances 39 are rigidly attached to motor box 34, with the dual function of contributing to the static balance of the blade around the axis of mill shaft 20, and around teetering pivot 21, and contributing to the centrifugal blade flattening action acting on airfoil 2. They function as a "balanced pair". (See FIGS. 1C, 1D, and 1E and related text, including expression (5).) In FIG. 12, they lie in the chord plane or airfoil 2, but in particular designs, these and other balanced pairs described below may lie at an angle $\psi$ out of that chord plane (FIG. 1E).

Mass balances 40 are rigidly attached to the end of motor box 34. They serve only to balance the blade around mill axle 20 and around teetering pivot 21. Being symmetrically disposed around axis p they exert no centrifugal pitching moments on airfoil 2.

Mass balances 41 are movable "anti-blade-flattening" masses, operating as a balanced pair. Motor 42, also marked with "r" to indicate its function (see expressions (4) and (5)), shaft-connected to gear box 43, turns jack screws 44 in opposite directions separating the two masses 41, increasing r in expression (5); or by reversing motor 42, drawing them toward each other, decreasing r.

The structure connecting mass balances 39, 40, and 41 to airfoil 2 is rigid, through motor box 34, blade hub shank tube 33 and structural plates 35. Mass balances 6A and 6B statically balance the aerodynamic side of the blade around axis p—p. The stub side of the blade is also balanced around axis p, all of its parts being symmetrically disposed.

The mass on the aerodynamic blade which is spread out in the chord plane of airfoil 2, consisting of masses 39, 6A and 6B, plates 35, and airfoil 2, acts as blade flattening centrifugal mass like the mass shown in the horizontal plane in FIG. 1D. The mass which is spread out in a plane through axis p perpendicular to the chord plane of airfoil 2, consisting of masses 41, jack screws 44, and the extended housing for these parts, acts as *anti*-blade-flattening mass. This anti-flattening mass has its greatest effect when masses 41 are separated from each other as far as possible. When in that position the net blade *flattening* pitching moments are at their least. When masses 44 are closest together, blade flattening action is at its greatest, for any given value of $\psi$ and $\omega$. See expression (5).

By operating motor 42, the radius r in expression (5) is varied, the centrifugal pitching moments are variedd, and the blade angle of the machine is controlled.

The blade flattening action is quantitatively described in the section "Centrifugal Glade Angle Control," but further qualitative description may be useful.

Changes of effective aerodynamic angle of attack, $\alpha$, leading to performance changes, opportunities to fine-tune the design of the windmill to a particular use, and means to control the pitch angle, $\beta$, of the blade during operation, are achieved by blade-flattening without losing the stress-relieving benefits of free-floating airfoil 2.

See FIGS. 9, 12, and 13. The center of mass of weights 6A and 6B and the center of mass of airfoil 2 lie in the blade in a geometrically flat central plane, in the plane of the paper. In this position, whirling rotations around mill shaft 20 produce no hinge moments around the axis of blade hub shank 33. But, as soon as any angular displacement of the rigid body containing weights 6A, 6B, and airfoil 2 occurs around the axis of shank 33 (due to the aerodynamic action of airfoil 2 as it whirls around the axis of shaft 20), centrifugal hinge moments around lengthwise axis p are generated. This action may be seen by mentally projecting the centers of mass of ballast 6A and 6B and of airfoil 2, generally toward mill shaft 20, specifically in directions parallel to the axis of tube 33 to a flat geometric plane containing the axis of mill shaft 20, and standing perpendicular to the axis of tube 33. Now, with the centers of the combined mass of 6A and 6B and the mass of 2 no longer in the plane of the paper, they lie on opposite sides of the axis of 20. Therefore, when whirling occurs around shaft 20, the masses of 6A and 6B, and the mass of 2 are forced outwardly away from shaft 20 by centrifugal action, carrying the airfoil to a "flatter" angle more nearly crosswise to the natural wind, and closer to lying in the whirling plane of the blade.

The amounts of the blade flattening hinge moments so produced are mathematically determinate by straightforward methods of analysis, so that any desired degree of this effect may be produced according to design needs for a particular windmill. A portion of this mathematical formulation is presented in the section "Centrifugal Blade Angle Control."

To increase the blade-flattening hinge moments beyond those due to the naturally occurring downstream position of center of mass of airfoil 2, additional downstream mass may be employed as represented in FIG. 12 by ballast 39, attached rigidly to the rear face of motor box 34. As ballast 39 is added to the *rear* face of motor box 34, the same amount of ballast is added to the *front* face to maintain balance around the axis of tube 33, as a balanced pair, further increasing the blade flattening action. Stronger blade flattening action is achieved by increasing the moment arms of both the forward and rearward ballast. By these means any desired strength of centrifugal blade-flattening hinge moments may be achieved.

By using the same principles, but applied at right angles to the flat plane containing masses 6A, 6B, 39, and airfoil 2, the blade-flattening action may be *reduced* to any desired degree, or reversed. Anti-blade-flattening ballast weights 41 are attached in a balanced pair in symmetrically opposite positions to motor box 34 adjacent to ballast 39, but with their centers of mass lying on a line perpendicular to the line joining the centers of mass of the balanced pair of masses 39. This arrangement accomplishes the desired reduction of blade flattening.

FIG. 13 shows anti-blade-flattening ballast weights 41, driven by electric motor 42 and jack screws 44, to control the moment arms of weights 41 around the central axis of shank tube 33, to decrease the aerodynamic angle of attack of airfoil 2 when weights 41 are separated from each other, and to increase the angle of attack when the weights are drawn close to each other.

This is a pitch change mechanism of unusual simplicity which has the advantage that airfoil 2 is *not* mechanically restrained in any way in angle of attack so that it is free to weathervane in gusts, thereby avoiding structural damage.

Motor 42 may be used to change the distance of separation of masses 41 to control the centrifugal pitching moments of the blade, as shown in FIG. 13.

Similarly motor 50 may be used to control the separation of masses 52 to control the centrifugal pitching moments of the blade, as shown in FIG. 15.

In FIG. 15, motor 53, acting through gear box 54, may be used to control the angle $\psi$ of the mass assembly consisting of jack screws 51, masses 52, motor 50, and the other associated parts which rotate together around axis p on bearings 55, in this way changing the centrifugal pitching moments acting on the blade.

Figure 20:
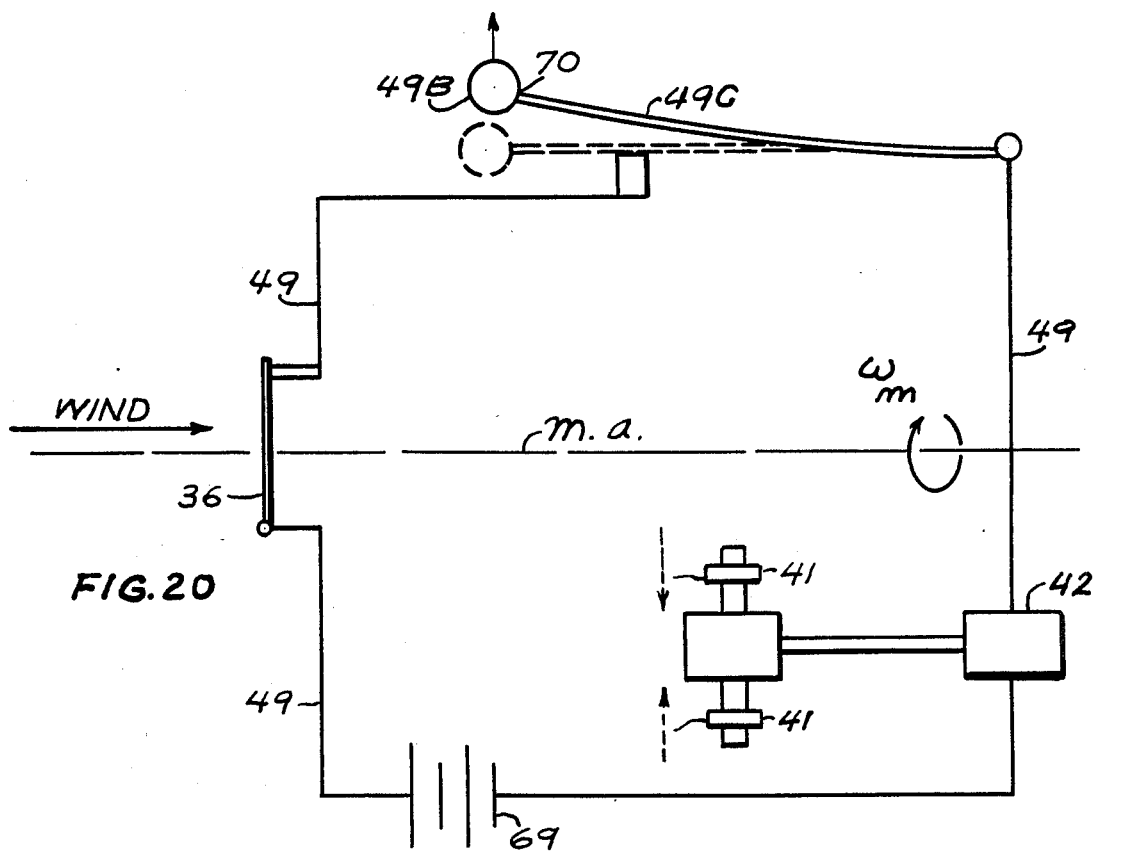
FIGS. 20 and 21 are diagrams illustrating control circuits for the wind machine.

Any of these means in a particular design may be used to govern mill axis RPM precisely, for generation of high quality alternating current for public utility power use. FIG. 20 illustrates the use of motor 42 and masses 41 for this purpose.

FIG. 20 is a circuit diagram: switches 36 and 70 are sensing and analyzing means; conductor 49 is signalling means; and power supply 69 and motor 42 are powered motor means. These means control the separation of centrifugal masses 41, to control the operation of the wind machine. Centrifugal switch 70, shown in FIG. 14 and in FIG. 20 whirls around the mill axis of the machine. Mass 49B experiences a radially outward centrifugal force, sensing RPM. At low RPM, electrically conducting spring 49C holds the switch closed, causing the circuit to operate to increase RPM: Current flows around the circuit due to conventional electrical power source 69, which may be a battery kept charged by the power output of alternator 30, or may be a source of voltage obtained from the electrical power grid served by the wind machine. Motor 42 turns in the direction to draw masses 41 closer together (see FIG. 13), increasing the nose-up centrifugal pitching moments on the blade, increasing blade angle of attack and blade lift, increasing RPM, as desired.

When RPM reaches the design level, calibrated spring 49C analyzes this point by bending just enough to allow mass 49B to rise, opening the electrical contact in centrifugal switch 70, interrupting the circuit, stopping the action at the desired RPM. Seen in greater detail, conductor 49 instantly signals the circuit interruption, current stops flowing, motor 42 stops turning, masses 41 retain their separation and RPM is controlled.

Switch 36, described below, is normally closed in this operation, the wind velocity being sufficient to permit power-generating operation of the machine.

FIG. 20 also illustrates the means for keeping RPM from becoming too great. Another circuit of the same type is used, but with actions reversed, which moves masses 41 apart from each other when RPM becomes too great. To obtain this result, a circuit is used otherwise identical to that in FIG. 20, in which conductor 49 at switch 70 is located just outboard of 49C; the circuit closes when RPM increases; motor 7 is wired to turn in the opposite direction; weights 41 spread apart; and blade whirling RPM decreases.

A low voltage system is used for the sensing and signalling in FIG. 20, and the range of travel of 49B is small. Suitable feedback and damping by well-known electronic means may be used to modify the control signals to motor 42, to avoid overrunning and hunting by motor 42. An electronic microprocessor, not shown, sensing all physical input affecting instantaneous RPM and governing blade pitch control motor 42 and roller-spinning motor 7, is capable by these means of controlling the windmill of this invention for the most exacting purposes, while retaining its gust-alleviation features.

Figure 21:
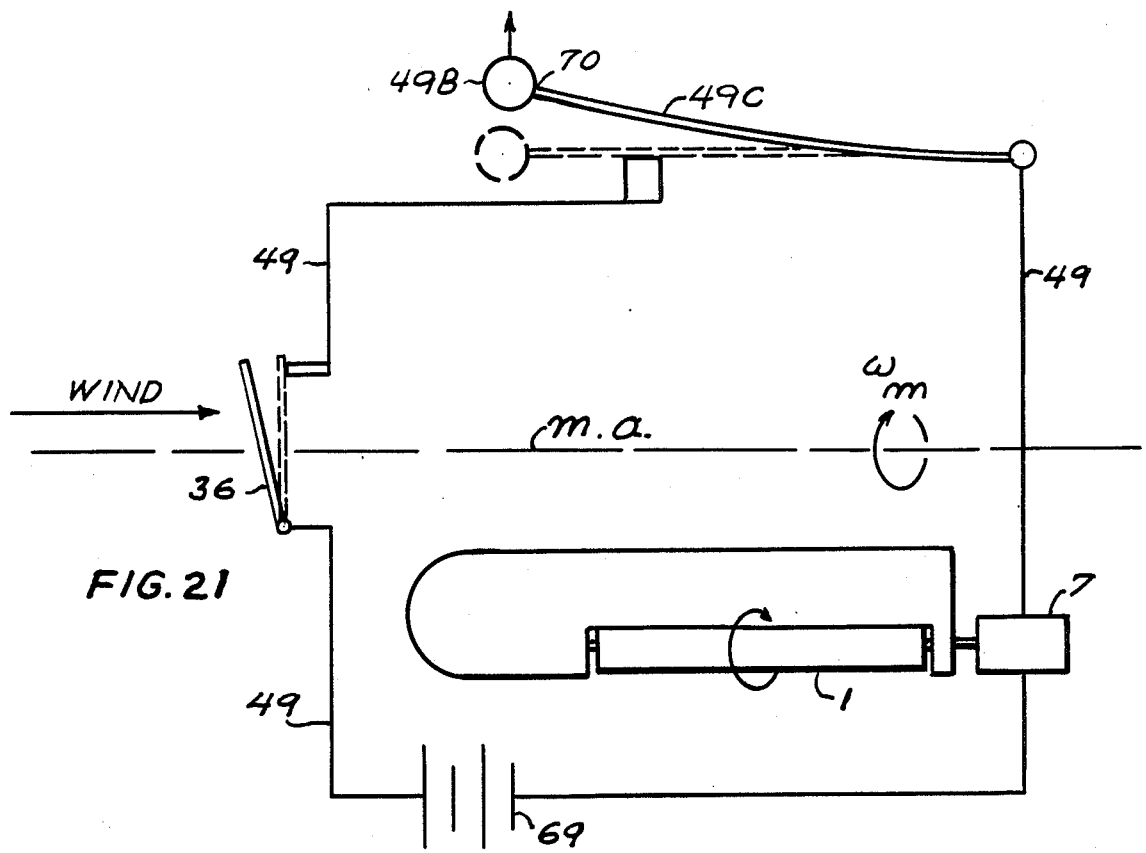

For simple purposes, the aerodynamic blade needs only fixed position blade flattening masses. FIG. 21 is a circuit diagram for such a blade. It contains the same sensing, analyzing, signalling, and power source means as FIG. 20, but in FIG. 21, the blade flattening masses are fixed in position, and motor 7 spins roller 1 to control the operation of the wind machine:

Wind-actuated on-off switch 36, shown in cross section in FIG. 14 automatically starts and stops the operation of the roller machine by starting and stopping the spinning of roller 1. Switch 36 senses the presence of the wind by means of diaphragm 45, which is forced downwind by wind pressure acting between upstream orifice 46 and lateral downstream orifices 47. Calibrated spring 47 analyzes the wind speed by the degree to which it bends. When there is sufficient wind speed for economical machine operation, spring 47 bends sufficiently to bring pressure-sensing diaphragm 45, which is also an electrical conductor, in contact with conductors 49, closing the electrical circuit diagrammed in FIG. 21. Conductor 49 signals the completed circuit to electrical power supply 69. Current flows in the completed circuit, spinning motor 7, which spins roller 1. The spinning of roller 1 increases the aerodynamic lift and reduces the aerodynamic drag on the aerodynamic blade of the machine, causes it to whirl and brings the machine into power-generating operation. The machine operates only so long as there is sufficient wind pressure acting on switch 36. When the wind velocity drops to a low value the process reverses. Wind analyzing spring 48 draws wind sensing diaphragm 45 forward, opening the electrical circuit of FIG. 21, motor 7 and roller 1 stop turning, blade lift decreases and blade drag increases, and the blade of the machine comes to rest.

In FIG. 21, centrifugal switch 70 serves as a safety switch to limit blade RPM to a structurally safe value. At the blade's design limit whirling speed, in a strong wind, with switch 36 closed, centrifugal switch 70 operates to prevent further increase in RPM. Mass 49B, mounted on the free end of current-carrying cantilever spring 49C, is moved by centrifugal reaction into the position shown, opening the circuit, shutting off the power, reducing the RPM of roller 1, reducing blade lift, increasing blade drag, and reducing blade whirling speed. By well known means, this limit switch may be designed to stay open in the manner of a circuit breaker, or it may be designed to open and close repeatedly to prevent excessive RPM and yet permit continuing operation.

The elementary control circuit diagrams in FIGS. 20 and 21 will suggest more elaborate circuits for specialized blade angle control situations, which retain mechanically free blade angle changing, with the numerous advantages described.

Dynamic Weathervaning Axis

The constructions of all the weathervaning single blades for horizontal axis wind machines shown in FIGS. 9, 12, 13, 15, and 19 have the following in common:

(a) Balancing stubs 19 are on one side of mill shaft 20; the centers of mass of these stubs lie on weathervaning axis p;

(b) Aerodynamic blades are on the opposite side of mill shaft 20; the centers of mass of these blades also lie on weathervaning axis p;

(c) Weathervaning axis p passes through the point of intersection of the axis of mill shaft 20 and the axis, perpendicular thereto, of teetering pivot 21; and (d) The center of mass of the entire weathervaning blade lies on the single point of intersection of the three axes, mill shaft, teetering pivot, and weathervaning pivot p.

This construction and balancing is accomplished by means of various fixed position mass balances, such as 6A, 6B, q, 40, and balanced pair 39—39; by movable balanced pairs of masses, such as 41—41 or 52—52; by axially symmetrical design along axis p such as motors 7, 42, 53, and 56, centrifugal flywheel 57, preloaded spring torsional relief unit 58, and various tubes, shafts, bearings, housings and attachment details.

This construction assures whirling balance of the blades, even though the blade is mechanically unrestrained at its attachment to mill shaft 20 in both teetering and weathervaning pitching around axis p.

The true physical axis p during operation is the dynamic weathervaning pitching axis of the blade. It coincides with the mechanical axis p when the blade is balanced as described in items (a) through (d) above.

Blade Variations—Horizontal Axis Wind Machines

FIG. 15 shows the hub and stub region of a blade of the same general type and in the same general position as the blade in FIG. 12, but incorporating several additional mechanisms to illustrate their operation and to show how they might be combined in one blade, when desirable to do so in a particular design.

The functions accomplished are: universal centrifugal blade angle control, varying both r and $\psi$ of expression (5); gyroscopic control of whirling disk coning angle $\theta$ (see FIG. 19, III); and pre-loaded spring action, one of several such actions available in this type of machine to permit power recovery in very strong winds without overloading the machine's structure, but progressively reducing aerodynamic angle of attack, and eliminating any need to shut down the machine.

FIGS. 12 and 13 have illustrated a blade with fixed position blade flattening masses and variable position *anti-flattening masses*. The blade of FIG. 15 now illustrates fixed mass distribution which is neutral or close to neutral, and has variable position *blade flattening masses*.

In FIG. 15, details of mill shaft 20, teetering pivot 21 and mounting base 3A including blade hub tube 31 and bearings 32, as shown in FIGS. 12 and 13, have been omitted for clarity. Motor box 34 and part of blade shank 33 have been opened to show a cross section of internal parts.

In FIG. 15, reversible electric motor 50 turns jack screws 51 to move the balanced pair of centrifugal masses 52—52 apart from each other or to draw them toward each other, varying r as defined at expression (5) and shown in FIG. 1C. This action resembles that in FIG. 12, except that the mounting axis of balanced pair 41—41 in FIG. 12 lies perpendicular to the plane of airfoil 2, and the mounting axis of balanced pair 52—52 in FIG. 15 lies in the plane of airfoil 2. Thus, balanced pairs 41—41 and 52—52 are at right angles to each other relative to blade 2 as a plane of reference. Balanced pair 41—41 are "*anti*-blade flattening," and balanced pair 52—52 are "blade flatteing."

To reduce the blade flattening action of the "natural" mass distribution of the blade of FIG. 15, a balanced pair of fixed position masses q—q, only one of which is visible in FIG. 15, stands perpendicular to the plane of airfoil 2. Also see FIG. 1A, upper sketch. The desired range of blade flattening effect in FIG. 15 may then be obtained by spreading balanced pair 52—52 as much as necessary.

The shaft of reversible motor 53 in FIG. 15 turns reduction gearing 54, which then turns balanced pair 52—52, motor 50, jack screws 51 and the surrounding casing (which supports and guides these parts) around pivot axis p, producing a change in angle $\psi$. See expressions (4) and (5), and FIGS. 1A, 1C, and 1E. This group of parts is pivotally mounted around axis p, at the end of motor box 34, with centrifugal loads along axis p due to whirling carried by thrust bearing 55.

The combined action of motors 50 and 53 completely controls the positioning of the balanced pair of masses 52—52, making possible the attainment of any desired centrifugal pitching moment at a particular whirling speed $\omega$, within the limits of the particular design. This is a fully controllable pitch control system for blade 2, which does not interfere with the free weathervaning gust-shedding action of blade 2. See expression (5), and FIGS. 1A, 1C, and 1E. Motors 50 and 53 are controlled by a programmed electronic microprocessor which instantly responds to wind and power values and continuously adjusts the positions of the centrifugal masses to operate the machine according to its programmed instructions. Continuous maximum available power output, or precisely controlled RPM, efficient operation at all wind velocities, protection against winds of hurricane force, automatic shutdown and start-up, and any special requirements for particular cases, are all controlled automatically without human attention and without impairing the machine's gust-shedding abilities.

Each motor shown in FIGS. 13 and 15 is marked on the drawing according to the physical quantity it controls:

| Motor No. | Symbol | Quantity | Reference Numbers FIGS. | Expressions |
|---|---|---|---|---|
| 7 | $\omega$ | Roller spin angular velocity | 3A, 3B | (1) |
| | $\gamma$ | | | |
| 42, 50 | r | Centrifugal mass radius | 1C | 4, 5 |
| 53 | $\psi$ | Centrifugal mass angle | 1A, 1C, 1E | 4, 5 |
| 56 | $\theta$ | Blade disk coning angle | 19, III | — |

Motor 56 on FIG. 15 rotates counter-spinning gyroscopic flywheel 57, in a direction counter to the direction of rotation of roller 1. Alternatively, motor 7 acting through a reversal gear could perform this function, in addition to spinning roller 1 (FIG. 19, example VI). Counter-spinning flywheel 57, keyed to the shaft of motor 56, generates a gyroscopic moment (expression (1)) which forces the outboard tip of the blade upstream to obtain increased aerodynamic performance. See the last paragraph of the section "Gyroscopic Actions," and FIG. 19, Configuration III, which applies this feature to a conventional airfoil type of blade not having an aerodynamic roller.

There is plenty of mass available for masses 41, 52, and 57 on single blade machines, since such mass is needed to balance the blade around mill shaft 20. A short stub is desirable aerodynamically and a short stub must be heavy.

Preloaded spring unit 58 is shown in FIG. 15. In general, this unit must be located between the active aerodynamic portion of the blade and the balanced pair of centrifugal masses which generates the major centrifugal pitching moments on the blade. This unit limits and monitors the strength of the nose-up pitching moment (see expression (5) and FIG. 1C) which can be transmitted from balanced pair of centrifugal masses 52—52, and its associated blade flattening parts, to airfoil 2. From zero pitching moment up to the pre-loaded pitching moment value built into the unit, pre-load unit 58 performs as a tosionally rigid shaft. Above that pre-load value, the unit transmits only the torsional moment exerted by the pre-load spring. See FIGS. 16 and 17. Airfoil 2 then is able to pitch nose down around pivot p relative to the mounting axis of balanced pair of masses 52—52, in an action relieveing aerodynamic normal pressures on airfoil 2.

In this aerodynamic relief action, it is necessary that the aerodynamic side of the whirling blade not have such strong blade flattening action due to its own mass distribution that it will generate excessive blade flattening pitching moments of itself, causing it to develop excessive aerodynamic pressure despite pre-load unit 58. Balanced pair of masses q—q in FIG. 1A, standing perpendicular to the plane of airfoil 2, one of which masses may be seen in FIG. 15, serves this function by reducing the otherwise strong "natural" blade flattening mass distribution of blade 2 (including its counterbalances 6A and 6B), to the point at which the nose down aerodynamic pitching moments (FIG. 1B) will predominate. It is a matter of design analysis to select the centrifugal pitching moment mass distribution in the aerodynamic blade, and to select a spring for unit 58 which together will prevent blade damage but will permit useful power to be generated at the highest natural wind speeds. In this analysis account must be taken of the action of balanced pair 52—52 (or any corresponding balanced pair which may be used in the particular case). The relief action of the pre-load unit allows $\psi$ to increase, and the nose up pitching moment which it generates then decreases rapidly as $\psi$ approaches 90 degrees, so that a strong stable limit may be imposed by design on the most severe values of RPM and aerodynamic pressure which the whirling blade can generate.

It is advantageous in some designs, to save total blade weight and reduce the centrifugal loads in the pre-load unit, to locate that unit on the stub side of mill shaft 20, especially if that position permits balanced pair q—q to be located on the stub side also, where its mass helps to balance the blade statically around the mill shaft instead of working oppositely. Balanced pair q—q in any case would still lie between the pre-load unit and the aerodynamic blade, and would be mounted torsionally rigid to the aerodynamic blade.

FIGS. 16 and 17 show details of pre-load spring unit 58. Coil spring 59, properly designed to have the correct coil diameter and length when pre-loaded, is assembled on the bench, with outer shank 60 and inner spindle 61, by means of threaded collar 61A, with each straight end of spring 59 passing through one of a circular ring of holes in the flanges of shank 60 and spindle 61. Oil impregnated sintered bronze bearings 62, previously pressed on shank 61, bear against inner smooth bored surfaces on outer shank 60, in a free-turning fit. Thrust roller bearing 63, of circular form, shown in cross section on FIG. 16, is held in matching ring-shaped recesses in collar 61A and shank 60, in a free-turning fit. Pin 64 is threaded into the inner portion of the flange of spindle 61, into a circular arc recess in the outboard face of shank 60, limiting the range of motion around axis p of shank 60 and spindle 61 relative to each other. Spring 59 is then compressed axially, to permit removal of one end from its flange hole, and the spring is pre-loaded in torsion around axis p to the design value, in the direction to press pin 64 against the end of the recess in shank 60, in the position shown in FIG. 17. The free end of spring 59 is then inserted in the closest hole in the circular ring of holes in the flanges. The pre-stressed unit 58 is then bolted in place in blade hub shank tubes 33A and 33B. (The original tube 33 now having had a section removed to provide space for 58, and having been equipped with attachment flanges matching those of 60 and 61.) Flange bolts, not shown, are installed and tightened, in all the holes in the flanges not occupied by the ends of spring 59.

The straight ends of spring 59 are threaded. A nut and a washer as shown on FIG. 16, at each end of spring 59, are turned to apply *tension* pre-load in spring 59, to a predetermined design value. The function of the tension pre-load is to carry a portion of the axial centrifugal load across pre-load unit 58 without passing through bearing 63. In that way, some compression load is taken off of bearing 63, at the time when the torsion pre-load has been reached, at which time axial centrifugal loads are also strong, allowing bearing 63 to rotate with reduced friction.

Tension pre-load is accomplished with no significant axial movement of the parts; in this way avoiding the blade unbalance which otherwise accompanies the use of a tension spring as a stress avoidance device in a whirling blade.

At low blade whirling RPM, the tension pre-load exerts pressure where the outer face of shank 60 bears on the inner face of the flange of spindle 61. This pressure is of no consequence when the blade is not whirling fast because the pre-load unit functions as a rigid joint at that time. But, when fast whirling occurs, the pressures across these bearing surfaces decrease, so that relative rotation of shank 60 and spindle 61 is no longer prevented.

When the torsion pre-load is exceeded, pin 64 moves off its position as shown in FIG. 17, in the direction of arrow A, allowing airfoil 2 to rotate in pitch, nose down, decreasing its lift coefficient, as far as necessary. Bear in mind that reduction of blade angle of attack by this means does *not* increase blade sensitivity to gusts as described in the case of positive mechanical control of blade angle, because now the blade always weathervanes freely so that it cannot accept significant lift changes due to gusts.

Observe also that the pitching moment of inertia of blade 2 is now detached, except through spring 59, from the greater pitching moment of inertia of stub 19, so that blade 2 is free to respond more quickly, to be better able to follow the very quick changes of flow angle in winds of very high velocity.

As shown in FIG. 17, the stress relief movement just described is available through a full 90 degrees (or more if necessary), making possible the complete unloading of any design of airfoil 2 in the most severe winds conceivable.

In FIG. 17, the arrows A and C represent respectively: A, the direction of movement of pin 64 due to aerodynamic pitching moments, and C, the direction of movement of shank 60 due to centrifugal hinge moments, around free weathervaning pivot p. Arrow A corresponds to FIG. 1B; arrow C corresponds to FIG. 1C. Torsion pre-load acts in the direction to hold pin p against the end of the recess in shank 60, as shown.

FIG. 18 shows a simpler construction which serves some of the functions of pre-load unit 58, located in the same position, which protects the blade in severe weather. It is a replaceable shear pin which fails when the opposing centrifugal moments and aerodynamic moments exceed a limiting structural design value. Smaller telescoping collar 65 is threaded on hub shank tube 33B on one side of the joint, and larger telescoping collar 66 is threaded on tube 33A on the opposite side of the joint, and the joint is pulled together by closure ring 67, threaded to the inside of collar 66. Smooth, accurate, lubricated surfaces of contact allow one side of the joint to rotate around axis p relative to the other side of the joint, and all threaded connections are locked with flush set screws, staked in place. Lubricated felt seals, not shown, seal out moisture and dust, protecting the sliding surfaces from corrision. With the two sides of the joint correctly aligned relative to each other around axis p, a hole is drilled through outer collar 66 into inner collar 65, and shear pin 68 is inserted and peened and staked in place.

When pin 68 fails in shear, the stub end of the blade is free to pitch on axis p to a position of zero centrifugal pitching moment, and the aerodynamic end of the blade is free to pitch to a fully feathered position of zero aerodynamic pitching moment, and the whirling blade comes to rest. All parts remain in balance, and all destructive loads are eliminated.

The replacement of pin 68 is a field operation. With the two ends of the blade rotated to a pre-marked position of correct relative alignment, a new hole is drilled to the prescribed depth through collar 66 into collar 65, and a new pin 68 is inserted. It is peened to spread it to fill the hold snugly, and it is staked to prevent removal, and the machine is back in operation, ready for a hurricane or tornado if one should ever strike.

A conventional wind turbine blade cannot benefit from a shear pin in the manner described. A conventional blade does not weathervane in a stable manner around a lengthwise pitching axis. Therefore, the failure of a shear pin in the blade shank which carries the entire torsional load would allow the blade to pitch flat to the wind in an unstable manner, bringing on the failure which it was supposed to prevent.

Design Options—Horizontal Axis Wind Turbines

A simpler version of the blade than shown in FIGS. 12 and 13 may be designed by omitting movable masses 41, motor 42, gear box 43, and jack screws 44, and installing in their place a fixed position balanced pair of masses having the correct values of mass $\Delta m_1$, and radius $r_1$ (see expression (4)), set at the correct angle $\Delta \psi$ from the airfoil chord plane (see FIG. 1E) to produce the most efficient blade angles in the particular machine's design operating range. Outside that range, at higher RPM, the aerodynamic efficiency would reduce, correspondingly reducing high wind runaway whirl speeds to acceptable levels while still generating power. Such a machine could control RPM accurately by controlling motor 7, increasing roller RPM for higher blade section efficiency and decreasing roller RPM to decrease blade whirling speed, and stopping the roller to stop the machine. Such a machine would use a roller-/airfoil section as shown in FIG. 8.

A simpler version of the roller machine just described would use a constant speed roller motor, and would be controlled only by an on-off motor switch. This machine would have its greatest aerodynamic efficiency at relatively low natural wind speeds, in which U/V of the roller would be large, and it would lose aerodynamic efficiency automatically in increasing wind speeds, automatically avoiding excessive whirling speeds, yet continuing to deliver as much power as can be converted by a relatively low cost electric generating system. Such a version could be used as a low cost mass production machine for resiential use, or in a slightly different form for pumping water for stock or for irrigation in farm/ranch use. A machine of this type could be designed for high torque to pump water during seasons of little wind, or in valley locations. Alternatively the machine could be located on a hill nearby, generating electricity for direct use by an electric pump in the valley, in a locally self-contained electrical system. See Configuration II in FIG. 19.

Yet a simpler version of the invention, retaining all of its gust-alleviating features, would operate without the aerodynamic roller or roller motor, using a single airfoil type blade, for private ownership, supplying power into the public utility power lines. This machine would always be in operating position, and would stop whirling only when the wind stopped. Its fixed position centrifugal mass distribution would be designed and adjusted to harvest the maximum amount of power from the wind spectrum in the locality where it would be used. If, in some such cases there was risk of high winds producing excessive RPM, a shear pin construction as shown in FIG. 18 would be used.

Any of these machines may be designed to avoid the need to be *shut down* in strong winds. They are all capable of progressively reducing aerodynamic efficiency in the stronger winds, and the pre-load unit of FIGS. 16 and 17 can be applied to monitor RPM and power output so as not to overload structure or electrical systems, with the result that they may all harvest power when it is abundant, limited only by means to absorb the power and use it or store the energy.

For wind sites where wind speeds are especially strong, the proportions of the machines would be designed accordingly, with relatively broader blades, slower tip speed ratios, and correspondingly larger diameter rollers, spinning at higher surface velocity U.

Machines of different sizes using particular blade planform proportions, designed for a given natural wind speed, tend to have about the same tip speed ratio, so that the operating tip speed is about the same for all. Therefore, small blades whirl at high RPM and the large blades whirl at low RPM. Consequently, large machines, relative to their blade weight, have smaller centrifugal forces, and large roller blades have smaller gyroscopic moments than do small roller blades. The angular velocities of whirling, $\omega_m$, and roller spin, $\omega_r$, tend to be smaller as blade and roller radii are greater. Therefore, (see expression (1)) the roller mountings on large machines are more lightly loaded, relative to roller weight, than on small machines, relatively favoring the use of rollers on large machines as compared to small machines.

It is less difficult on large machines to develop a high roller U/V. The local blade section resultant wind velocity $V_R$ at a particular percentage blade radius section tends to be equal for both large and small roller blades, but a large value of circumferential spinning velocity, U, is much more easily attained on the larger rollers. RPM need not be so large; special high speed motors or gear boxes are not needed. The rollers are stiffer, balancing may be more precise, and physical clearances are larger in absolute values, enabling relatively greater aerodynamic refinement to be accomplished on the larger roller/airfoils.

On the smallest wind turbines, roller airfoils of the most efficient form for power recovery are largely ruled out by practical difficulties—the reverse of those advantages stated above—RPM values are higher than existing practice, or U/V values are too low to obtain sufficient aerodynamic benefit of the rollers.

Consequently, in design, there is a tendency for roller/airfoils to serve best on the larger machines, and plain airfoils to serve best on the smaller. The airfoil tip which is present on all these blades tends to be relatively smaller on the larger machines, becoming larger on the smaller machines until it supplants the roller altogether.

An exception to this trend is a roller/airfoil machine designed to produce strong torque, rather than the most effecient power recovery. See example II in FIG. 19.

The location on a blade at which the roller/airfoil serves best is toward the root end. Resultant local section wind velocity is small there, so U/V is large. Large lift coefficients are needed there; these are provided by the high U/V.

Toward the tip the conventional airfoil section provides lift coefficients as high as needed. Consequently in the tip regions of the blade, where high U/V for the roller cannot be attained, the airfoil section outperforms the roller/airfoil combination section. Also, in any case, an airfoil tip beyond a spinning roller is always basically needed to reduce the induced drag of the roller.

Consequently, the roller blade always has an airfoil tip outboard and a roller/airfoil combination inboard.

Roller/airfoil sections near the root are valuable in the start-up operation. They whirl the blade well, bringing it up to the values of $\omega$ and $\psi$ at which (expressions (4) and (5)) the centrifugal masses accomplish blade angle control. But a roller can become so short on the root end of the blade that it cannot sufficiently control the blade for this transition, and is too short for controlling whirling RPM by varying roller speed. At that point, the weathervaning conventional blade without roller becomes preferable in design.

FIG. 19 shows a spectrum of machine types. Table I identifies the types and indicates the field of application and the features of each type.

The examples shown in FIG. 19 do not show all the useful combinations; these may change with each particular use. Blade proportions will also vary due to design choices. All the examples are single blade machines with blades weathervaning in pitch using centrifugal blade angle control. In the real case, each type would be designed by iterative computer analysis to fill the specified needs for the machine, and would be tested with any sensitive quantities variable on the first prototype, to permit experimental tuning for top performance.

All accomplish gust relief automatically, so that all are insensitive to turbulence at the wind site.

There is no size scale in FIG. 19, except for a generally increasing size from Configuration I to Configuration VI. Blades are shown in planform except for Configuration III which is shown in its whirling plane. All details of the hub and balancing stub have been omitted. All information concerning power beyond the mill shaft (generation of electricity, pumping of water, etc.) has been omitted.

Configuration I

The smallest, simplest machine. No roller, no motor, fixed position centrifugal masses, no pre-load spring. One piece blade with no moving parts, weathervaning and teetering at blade hub tube 31. Solid one piece blade stub. Safety shear pin. Parking angle stop at 45 degrees. Machine operates continuously whenever wind is blowing. For private residences with tie-in with public utility electric power network. Unlike conventional machines, operates efficiently in urban turbulence conditions.

Configuration II

The smallest roller machine. Rural. Broad blade. Relatively low whirling RPM. Primarily for developing torque rather than power. Fixed position centrifugal mass distribution, adjusted and permanently set to customer needs and wind site data. Roller/airfoil blade section like FIG. 8 with large value of i. Produces automatic drag coefficient increase at decreasing U/V, moderating the strongest winds. Safety shear pin. Blade feathered in power-off parking. Reverse tapered blade and roller maintain high U/V toward tip. Twisted, slotted airfoil beyond roller tip. Constant RPM roller motor, with on-off switch operated by wind speed and storage, such as water level in storage tank. Extreme RPM limited by centrifugal motor circuit switch. Rural water pumping for stock or irrigation, suitable for low wind localities and seasons.

Configuration III

Like I but large, with refinements, and coning of the whirling disk. Uses motor 56 spinning gyroscopic flywheel 57 in stub, like FIG. 15, to produce forwardly concave whirling disk for increased aerodynamic efficiency. Motor-moved centrifugal masses, governed by programmed microprocessor, to control all operations for efficient power output in response to wind conditions and power needs. Pre-loaded spring moderates strongest winds, prevents runaway. Electric power source tie-in with public utility system, residential community and industrial plants. Operates efficiently in urban turbulence.

Cofiguration IV

Like III, but larger, and simpler, without formed coning of whirling disk. Fixed position centrifugal masses. Only one small motor, controlled by microprocessor, adjusts angular setting of trim tab at trailing edge at tip, for fine tuning of blade angle. Pre-loaded spring moderates extreme winds. Public utilities, residential communities, sea shore resorts, industrial plants, wind farms.

Configuration V

A large roller type for high efficiency power recovery, with roller toward root and airfoil blade toward tip. Single large diameter high RPM roller. Roller/airfoil sections like FIG. 8, with offset i decreasing in blade sections progressively outboard. Operating Reynolds number at outer roller/airfoil sections to be above the roller critical Reynolds number. Fixed position centrifugal masses. One motor. Machine controlled by motor/roller spin RPM, governed by microprocessor. Pre-loaded spring moderates severest winds. Centrifugal switch limits RPM. Wind farms, public utilities.

Configuration VI

The largest, most efficient type. Precision balanced roller segments increase spin RPM toward tip, by means of gearing between segments. Roller/airfoil sections like FIG. 8, with i decreasing outboard across each segment. Two electric motors: (1) to spin rollers and counter-mass in stub for forward coning, and (2) to move centrifugal masses. Microprocessor controls motors (1) and (2), and controls blade; manual input instructs microprocessor to override programmed instructions. Pre-loaded safety spring unit monitors blade angle relief in unusually strong winds. Centrifugally operated power-off safety switch in the power supply to motor (1) prevents malfunction runaway. Public utilities, for major regional power projects.

TABLE I

| | Examples of Single Blade Wind Turbines | | | | | |
|---|---|---|---|---|---|---|
| | CONFIGURATION | | | | | |
| FEATURE | I | II | III | IV | V | VI |
| Roller | | Yes | | | Yes | Yes |
| Roller RPM | | Constant | | | Variable | Variable |
| Weather-vaning Blade | Yes | Yes | Yes | Yes | Yes | Yes |
| Centrifugal Blade Pitch | Yes | Yes | Yes | Yes | Yes | Yes |
| Centrifugal Masses | Fixed | Fixed | Movable | Fixed | Fixed | Movable |
| Trim Tab | | | | Yes | | |
| Efficient in Turbulence | Yes | Yes | Yes | Yes | Yes | Yes |
| Primary Output | Power | Torque | Power | Power | Power | Power |
| Microprocessor | | | Yes | Yes | Yes | Yes |
| Blade Tip | Plain | Slotted, Twisted | Plain | Plain | Plain | Plain |
| Safety Power Shut-Off to Roller Motor | | Yes | | | Yes | Yes |
| Moderating Pre-Loaded Spring | | | Yes | Yes | Yes | Yes |
| Safety Shear Pin | Yes | Yes | | | | |
| Unusual Features | | Reverse Taper, Broad Blade | Coning | Control by Tab | Control by Roller RPM | Geared up, Segmented Roller, Coning |
| Use Category | Smallest, Homes, Public Utility Tie-in | Small, Rural, Light Wind Sites | Medium, High Efficiency, Public Utility Tie-in | Medium/Large, Public Utilities, Wind Farms | Large, Public Utilities, Wind Farms | Largest, Major Projects |

I claim:

1. A wind power machine comprising an aerodynamic blade, said blade comprising an aerodynamic roller supported by said blade pivotally attached lengthwise in the leading edge of said blade, powered motor means spinning said roller, said aerodynamic blade comprising extensive airfoil surface area rigidly supported by stress-carrying structure; said extensive airfoil surface area comprising extensive outwardly-positioned airfoil surface area lying outboard separated from and beyond the outermost active aerodynamic surface of any said roller, said extensive outwardly-positioned airfoil surface area having an aerodynamic span markedly greater than the maximum diameter of said roller, both of the opposite surfaces of said extensive outwardly-positioned airfoil surface area being exposed to the wind, substantially increasing the lift and reducing the induced drag of said blade, said extensive airfoil surface area comprising substantial rearwardly-positioned airfoil surface area lying rearward of said roller; said blade comprising stress-carrying structure attaching said outwardly-positioned and said rearwardly-positioned airfoil surface areas rigidly to each other; a stress-carrying power-generating joint attaching said rearwardly-positioned airfoil surface area structurally to mechanical power transmission means attached to said wind machine, said power-generating joint structurally transmitting the entire wind-generated power output of said blade to said power transmission means, producing power-generating movement of said wind power machine.

2. In claim 1, said extensive outwardly-positioned airfoil surface area comprising a plate, said plate standing generally transverse to the spinning axis of said roller, said plate extending laterally from the central axis of said roller a distance greater than the maximum diameter of said roller.

3. In claim 1, said rearwardly-positioned airfoil surface area having a cross section of symmetrical form, an aerodynamic shield having a cross section in the form of a thin segment of a circular arc, said shield being movably positioned between said spinning roller and said rearwardly-positioned airfoil surface area, said shield being free to shift position along the arc of a circle centered on the spinning axis of said roller, said spinning roller shifting the position of said shield in the direction of spin of said roller.

4. In claim 1, said wind power machine comprising a ship having said blade vertically attached thereto whereby power extracted from the wind provides the power to move said ship.

5. In claim 1, said spinning aerodynamic roller interacting aerodynamically with said extensive outwardly-positioned airfoil surface area and with said substantial rearwardly-positioned airfoil surface area, changing the aerodynamic force on said blade, said wind machine comprising sensing and analyzing means, sensing and analyzing the operating conditions affecting said wind power machine, and signalling and power supply means; said signalling means signalling from said sensing and analyzing means to said power supply means, said power supply means powering said motor means, said motor means spinning said roller at a different speed in response to a different operating condition, thereby controlling the operation of said aerodynamic blade.

6. In claim 1, said power-generating joint comprising variable blade angle aerodynamic weathervaning means, said weathervaning means comprising a freely turning weathervaning pivot lying on a blade pitching axis lengthwise of said blade generally parallel to the length of said blade, said freely weathervaning pivot comprising low friction bearings said lengthwise pitching axis lying forward of the mean effective aerodynamic center of said blade, and balancing mass rigidly attached to said blade forward of said blade pitching axis, the total of said balancing mass balancing said blade around said blade pitching axis.

7. In claim 6, said wind power machine comprising a rotating horizontal mill shaft, said power-generating joint attaching said aerodynamic blade radially to said mill shaft.

8. In claim 7, said powered motor means comprising an electric motor and centrifugal switch means controlling the power to said motor in response to the whirling speed of said aerodynamic blade around said mill shaft.

9. In claim 7, said joint comprising a freely yielding pivot on a teetering axis, said blade comprising a short balancing stub attached to said blade on the opposite side of said teetering pivot from said roller, said balancing stub comprising high density mass balancing the weight of said blade around said teetering pivot.

10. In claim 7, said rearward aerodynamic surface area and said aerodynamic roller in combination having a streamwise cross-sectional profile in which the external surface of said roller is exposed in the upwardly moving most forward region of said roller and in the rearwardly moving upper region of said roller, and is covered in the downwardly forwardly moving region and in the forwardly moving lowest region of said roller.

11. In claim 10, said profile comprising an upper surface contour line having an abrupt change of direction, said contour line when traced from front to rear following the circular arc upper surface of said roller to the downwardly circling rear surface of said roller, said contour line abruptly leaving said rear surface, forming an angle locally, the vertex of said local angle lying on the surface of the downstream side of said roller.

12. In claim 10, said profile comprising a lower surface contour line following a smoothly faired reflex curve, downwardly convex in its forward region and downwardly concave in its rearward region; and a thin cusp at its trailing edge.

13. In claim 7, said blade comprising a gyroscopic moment generator for the purpose of generating gyroscopic teetering moments acting on said blade, said gyroscopic moment generator comprising a spinning mass in addition to said spinning roller, said additional spinning mass being markedly more dense physically than said spinning roller; said gyroscopic generator being pivotally attached to said blade in the shank region thereof, adjacent to said spinning roller, on a spinning axis lying lengthwise of said blade; powered motor means spinning said gyroscopic generator; said gyroscopic generator spinning in the opposite direction from said spinning roller, producing gyroscopic moments opposite from those produced by said spinning roller.

14. In claim 7, said blade comprising a balanced pair of dense symmetrical masses attached symmetrically to said blade, said dense masses lying in the plane of said lengthwise pitching axis at equal perpendicular distances from said pitching axis on opposite sides thereof, said dense masses producing centrifugal blade pitching moments around said lengthwise pitching axis when said blade whirls around said mill axle.

15. In claim 6, said aerodynamic blade comprising a trailing edge trim tab.

16. In claim 6, said wind power machine comprising a wind ship, said blade being attached upright thereto by said power-generating joint, said balancing mass comprising two balancing masses, an upper mass attached above the upper end of said roller and a lower mass attached below the lower end of said roller, said lower mass comprising the mass of blade pitch control means attached to said blade well forward of said lengthwise blade pitching axis, said blade pitch control means controlling said freely weathervaning pivot in said power-generating joint, said blade pitch control means comprising blade pitch locking means locking said weathervaning pivot, preventing weathervaning; blade pitch freeing means freeing said weathervaning pivot, permitting weathervaning; and blade pitch powered drive means changing the angle of said blade, overcoming the weathervaning tendency of said blade; the total of said upper and lower balancing masses comprising static and dynamic balancing means balancing said blade around said weathervaning pivot during accelerated rotations of said ship around the dynamic rolling axis of said ship.

17. A wind power turbine comprising a horizontal axis mill shaft, an aerodynamic blade attached radially to said mill shaft, said aerodynamic blade comprising a tip region extending over more than the outer one-third of the radial length of said blade, all of the external aerodynamically active surface area of said tip region consisting of stationary airfoil surface area; said blade comprising stationary airfoil surface area in addition to said airfoil surface area in said tip region, said additional stationary airfoil surface area being attached rigidly to said stationary airfoil surface area in said tip region; a joint structurally attaching said additional stationary airfoil surface area to said mill shaft, said joint comprising a teetering pivot perpendicular to the radial length of said blade and perpendicular to the axis of said mill shaft; a gyroscopic moment generator comprising a high density mass spinning at high angular velocity on pivots attached rigidly to said blade on a pivot axis lying lengthwise of said blade, and a motor spinning said gyroscopic moment generator, said blade whirling in an obtuse cone-shaped whirling surface, the speed and direction of rotation of said motor determining the coning angle of said whirling blade.

18. A wind power turbine comprising an aerodynamic blade, said blade comprising a tip region extending over more than the outer one-third of the radial length of said blade, all of the external aerodynamically active surface area of said tip region consisting of stationary airfoil surface area, a horizontal mill shaft, and power-generating joint means attaching said blade radially to said mill shaft, said joint means structurally transmitting the entire wind-generated power of said blade to said mill shaft, said joint means comprising a free teetering pivot perpendicular to said horizontal mill shaft, said joint means comprising variable blade angle aerodynamic weathervaning means, said weathervaning means comprising a freely turning weathervaning pivot lying on a weathervaning blade pitching axis lengthwise of said blade generally parallel to the length of said blade and generally perpendicular to said horizontal mill shaft, said weathervaning pivot comprising low friction bearings, said lengthwise blade pitching axis lying forward of the mean effective aerodynamic center of said blade, said blade comprising balancing mass forwardly attached thereto, the total of said balancing mass attached to said blade balancing the weight of said blade around said lengthwise blade pitching axis.

19. In claim 18, said blade comprising lift-increasing means; said lift-increasing means comprising an aerodynamic roller pivotally attached lengthwise in the leading edge of said blade toward the root end of said blade, an airfoil portion of said blade comprising a first substantial part of said airfoil portion lying rearward of said roller, and a second substantial part of said airfoil portion lying outboard of the outer end of said roller, said first and second parts of said airfoil portion being attached rigidly together, and a powered motor spinning said roller; said lift-increasing means increasing lift on said roller and on both the first and second parts of said airfoil portion of said blade in response to an increasing rate of rotation of said aerodynamic roller around its central axis.

20. In claim 18, said blade comprising additional balancing masses attached thereto balancing the weight of said blade around said teetering pivot and around said mill shaft, said blade comprising a long predominately aerodynamic portion lying on one side of said mill shaft, and a short heavy balancing stub lying on the opposite side of said mill shaft, both said long aerodynamic portion and said short balancing portion of said blade balancing on said weathervaning blade pitching axis, said blade comprising centrifugally active blade pitching masses attached thereto, said masses comprising a symmetrically balanced pair of masses lying in a flat plane intersecting the mean effective chord plane of said blade at a small acute angle, sad flat plane containing said blade pitching axis, said masses being located perpendicularly equidistant from and on opposite sides of said pitching axis, whereby, when said blade is whirling around said mill shaft, said balanced pair of masses produces a centrifugal pitching moment acting on said blade around said blade pitching axis in the direction to increase the angle of attack of said blade, for purposes of automatic blade angle control as described.

21. In claim 18, said blade comprising centrifugal blade pitching moment means attached thereto producing blade pitching moments around said freely turning weathervaning pivot in the direction to increase the angle of attack of said blade when said blade is whirling around said horizontal mill shaft, said centrifugal blade pitching moment means comprising a symmetrically balanced pair of masses lying in a flat plane containing said blade pitching axis, in positions perpendicularly equidistant from, and on opposite sides of, said blade pitching axis; said variable blade angle aerodynamic weathervaning means comprising a cambered airfoil blade cross-section having its flatter side facing the natural wind, and having its aerodynamic center rearward of the intersection of said blade pitching axis with said airfoil blade cross section, said variable blade angle aerodynamic weathervaning means producing aerodynamic blade pitching moments around said freely turning weathervaning pivot in the direction to decrease the angle of attack of said blade, the blade angle of said blade being determined by the position of balance between said centrifugal pitching moments and said aerodynamic pitching moments acting in opposite directions, as described.

22. A wind power machine comprising an aerodynamic blade and joint means attaching said blade to said machine, said joint means comprising variable blade angle aerodynamic weathervaning means, said weathervaning means comprising a freely turning weathervaning pivot lying on a blade pitching axis lengthwise of said blade generally parallel to the length of said blade, said lengthwise pitching axis lying forward of the mean effective aerodynamic center of said blade, said blade comprising balancing mass attached to said aerodynamic blade forward of said lengthwise axis balancing the weight of said aerodynamic blade around said lengthwise axis, said wind power machine comprising a horizontal mill shaft, said joint means attaching said blade radially to said mill shaft, said blade comprising variable blade angle centrifugal means, said centrifugal means producing hinge moments around said freely turning weathervaning pivot in the direction increasing the blade angle of said blade; said variable blade angle aerodynamic weathervaning means producing hinge moments around said freely turning weathervaning pivot in the direction decreasing the blade angle of said blade, the blade angle of said blade being determined by the position of balance between said centrifugal hinge moments and said aerodynamic weathervaning hinge moments acting in opposite directions, said blade comprising a breakable shear pin interposed between said variable blade angle aerodynamic weathervaning means and said opposing variable blade angle centrifugal means, said shear pin shearing apart when said hinge moments produced by said aerodynamic weathervaning means and said centrifugal means reach a design limit, allowing said blade to reduce its blade angle.

23. A wind power machine comprising an aerodynamic blade and joint means attaching said blade to said machine, said joint means comprisng variable blade angle aerodynamic weathervaning means, said weathervaning means comprising a freely turning weathervaning pivot lying on a blade pitching axis lengthwise of said blade generally parallel to the length of said blade, said lengthwise pitching axis lying forward of the mean effective aerodynamic center of said blade, said blade comprising balancing mass attached to said aerodynamic blade forward of said lengthwise axis balancing the weight of said aerodynamic blade around said lengthwise axis, said wind power machine comprising a horizontal mill shaft, said joint means attaching said blade radially to said mill shaft, said blade comprising variable blade angle centrifugal means, said centrifugal means producing hinge moments around said freely turning weathervaning pivot in the direction increasing the blade angle of said blade; said variable blade angle aerodynamic weathervaning means producing hinge moments around said freely turning weathervaning pivot in the direction decreasing the blade angle of said blade, the blade angle of said blade being determined by the position of balance between said centrifugal hinge moments and said aerodynamic weathervaning hinge moments acting in opposite directions, a pre-loaded spring interposed in said blade between said variable blade angle aerodynamic weathervaning means and said opposing variable blade angle centrifugal means, said pre-loaded spring yielding when its pre-load is exceeded, allowing said hinge moments produced by said aerodynamic weathervaning means to reduce the blade angle of said blade.

24. In claim 23, said pre-loaded spring being a coil spring pre-loaded in both torsion and tension, said blade comprising a thrust bearing carrying compression loadings which are relieved by the tension of said pre-loaded spring.

25. A wind power machine comprising an aerodynamic blade and joint means attaching said blade to said machine, said joint means comprising variable blade angle aerodynamic weathervaning means, said weathervaning means comprising a freely turning weathervaning pivot lying on a blade pitching axis lengthwise of said blade generally parallel to the length of said blade, said lengthwise pitching axis lying forward of the mean effective aerodynamic center of said blade, said blade comprising balancing mass attached to said aerodynamic blade forward of said lengthwise axis balancing the weight of said aerodynamic blade around said lengthwise axis, said wind power machine comprising a horizontal mill shaft, said joint means attaching said blade radially to said mill shaft, said blade comprising variable blade angle centrifugal means, said centrifugal means producing hinge moments around said freely turning weathervaning pivot in the direction increasing the blade angle of said blade; said variable blade angle aerodynamic weathervaning means producing hinge moments around said freely turning weathervaning pivot in the direction decreasing the blade angle of said blade, the blade angle of said blade being determined by the position of balance between said centrifugal hinge moments and said aerodynamic weathervaning hinge moments acting in opposite directions, said variable blade angle centrifugal means comprising a balanced pair of masses, said balanced pair of masses consisting of two discrete masses of equal weight symmetrically disposed on a straight line perpendicularly intersecting the axis of said freely turning weathervaning pivot, said discrete masses being equally distant from said axis of said freely turning weathervaning pivot on opposite sides thereof; said balanced pair of masses being attached to said blade on movable mounting means lying along said straight line, said movable mounting means being symmetrical and balanced on opposite sides of said axis of said freely turning weathervaning pivot.

26. In claim 25, said movable mounting means moving said balanced pair of masses radially, simultaneously and symmetrically, along said straight line to positions of changed radius from said axis of said freely turning weathervaning pivot, which changed positions are still equally distant from said axis of said freely turning weathervaning pivot on opposite sides thereof.

27. In claim 25, said movable mounting means moving angularly around said axis of said freely turning pivot, carrying said balanced pair to changed angular positions, relative to the blade angle of said aerodynamic blade, which changed angular positions remain in the same plane and are still equally distant from said axis of said freely turning weathervaning pivot on opposite sides thereof.

28. In claim 25, said blade comprising power means actuating said movable mounting means, moving said balanced pair of masses to new positions, in which new positions they remain a balanced pair as defined, centrifugally adjusting the blade angle of said blades, whereby the operation of said machine is controlled.

29. A wind power machine for extracting energy from the wind comprising a horizontal mill axle, a blade attached to said mill axle in a position generally perpendicular to the axis of rotation of said mill axle, said blade being pivotally attached to said mill axle on an axis of rotation running lengthwise of said blade, the center of mass of said aerodynamic blade lying generally rearward of said pivot axis lying lengthwise of said blade, a compensating mass balance attached to said blade having its center of mass forward of said lengthwise axis, both of said centers of mass and said lengthwise axis lying generally in a single flat geometric plane, such that when said blade whirls around said horizontal mill axle, both of said masses are centrifugally forced outwardly away from said mill axle, causing said blade to rotate around said lengthwise axis, moving said centers of mass toward the whirling plane of said blade in a blade flattening action as described; and an additional mass balance attached to said blade in a second flat geometric plane standing perpendicular to above first-said flat geometric plane, whereby said blade flattening action may be reduced to any degree required by design, as described.

30. In claim 29, displacement means for moving said additional mass balance to variable distances from said lengthwise axis of blade rotation.

31. In claim 30, power means actuating said displacement means, and signalling means actuating said power means, whereby said blade flattening action of claim 29 is controlled in operation to produce desired changes of blade angle of attack, thereby controlling the rate of rotation of said mill axle, as described.

32. A self-adjusting wind power machine comprising an aerodynamic blade, said blade comprising a long aerodynamic portion and a short balancing stub portion; a horizontal power shaft, a shaft joint attaching said blade radially to said shaft, said shaft joint comprising freely weathervaning blade pivot means around a blade pitching axis lengthwise of said blade forward of the effective aerodynamic center of said blade, and freely teetering pivot means around a blade teetering axis perpendicular to said blade pitching axis and perpendicular to the axis of said power shaft; balancing mass rigidly attached to said blade forward of said blade pitching axis, the total of said balancing mass balancing said blade around said blade pitching axis, said short balancing stub portion of said blade comprising concentrated mass attached rigidly to said blade on the opposite side of said power shaft from said long aerodynamic portion of said blade, said stub portion comprising centrifugal mass means producing blade pitching moments in the direction to increase the angle of attack of said blade, a horizontal body member, pivot means in said body member supporting said power shaft, a vertical mast supporting said body member, mast joint means attaching said body member to said mast, said mast joint means comprising freely yawing pivot means around a vertical axis and freely pitching pivot means around a horizontal axis perpendicular to the length of said body, and aerodynamic weathervaning means attached to said body permitting free weathervaning around said yawing and said pitching mast joint pivot means.

* * * * *